(12) United States Patent     (10) Patent No.:    US 9,364,756 B2
Nogami et al.                                (45) Date of Patent:    *Jun. 14, 2016

(54) COMPUTER-READABLE STORAGE MEDIUM, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventors: Hisashi Nogami, Kyoto (JP); Tomoaki Tsuji, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/667,606

(22) Filed: Mar. 24, 2015

(65) Prior Publication Data

US 2015/0224393 A1     Aug. 13, 2015

Related U.S. Application Data

(63) Continuation of application No. 13/326,736, filed on Dec. 15, 2011, now Pat. No. 9,011,244.

(30) Foreign Application Priority Data

Jun. 3, 2011     (JP) .................................. 2011-125647

(51) Int. Cl.
     *A63F 9/24*           (2006.01)
     *A63F 13/213*       (2014.01)
     *A63F 13/30*         (2014.01)
     (Continued)

(52) U.S. Cl.
     CPC ............... *A63F 13/213* (2014.09); *A63F 13/12* (2013.01); *A63F 13/537* (2014.09); *A63F 13/655* (2014.09); *H04N 21/4126* (2013.01); *H04N 21/43615* (2013.01); *H04N 21/4781* (2013.01); *A63F 2300/1093* (2013.01); *A63F 2300/204* (2013.01); *A63F 2300/403* (2013.01);
     (Continued)

(58) Field of Classification Search
     CPC .......... H04N 21/4122; H04N 21/4126; H04N 21/43615; H04N 21/4781; B06F 3/1423
     See application file for complete search history.

(56) References Cited

U.S. PATENT DOCUMENTS

| 6,951,516 | B1 | 10/2005 | Eguchi et al. |
| 7,326,117 | B1 | 2/2008 | Best |

(Continued)

FOREIGN PATENT DOCUMENTS

| JP | 11244531 A | 9/1999 |
| JP | 2004-216033 | 8/2004 |

(Continued)

OTHER PUBLICATIONS

JP11-244531, Omura, Jun, Game Device, Game System and Information Storage Medium, Sep. 14, 1999, 9 pages.

(Continued)

*Primary Examiner* — Jay Liddle
*Assistant Examiner* — Alex F. R. P. Rada, II
(74) *Attorney, Agent, or Firm* — Nixon & Vanderhye P.C.

(57) ABSTRACT

An exemplary game system includes a monitor for displaying a game image or a television program, and a terminal device having a camera, a microphone, and a loudspeaker. When a user is playing a game or viewing a television program by using the monitor, another user can have chat by using the terminal device.

12 Claims, 16 Drawing Sheets

(51) Int. Cl.
   H04N 21/41    (2011.01)
   H04N 21/436   (2011.01)
   H04N 21/478   (2011.01)
   A63F 13/537   (2014.01)
   A63F 13/655   (2014.01)

(52) U.S. Cl.
   CPC ..... *A63F2300/405* (2013.01); *A63F 2300/407* (2013.01); *A63F 2300/572* (2013.01)

(56) References Cited

U.S. PATENT DOCUMENTS

| | | | |
|---|---|---|---|
| 7,744,465 | B2 | 6/2010 | Suzuki et al. |
| 8,317,615 | B2 | 11/2012 | Takeda et al. |
| 9,011,244 | B2* | 4/2015 | Nogami ............... A63F 13/12 463/1 |
| 2005/0187015 | A1 | 8/2005 | Suzuki et al. |
| 2005/0270368 | A1 | 12/2005 | Hashimoto |
| 2008/0280684 | A1 | 11/2008 | McBride et al. |
| 2011/0124415 | A1 | 5/2011 | Shimono |
| 2011/0190061 | A1 | 8/2011 | Takeda et al. |
| 2011/0246908 | A1* | 10/2011 | Akram ........... H04N 21/234318 715/752 |
| 2012/0236210 | A1* | 9/2012 | Matsubayashi .... H04N 21/4126 348/739 |
| 2012/0309542 | A1 | 12/2012 | Nogami et al. |

FOREIGN PATENT DOCUMENTS

| | | |
|---|---|---|
| JP | 2005-167345 | 6/2005 |
| JP | 2006-140747 | 1/2006 |
| JP | 2008-50226 | 1/2008 |

OTHER PUBLICATIONS

English translation of JP11-244531, Omura, Jun, Game Device, Game System and Information Storage Medium, Sep. 14, 1999, 10 pages.

Office Action in JP Application No. JP 2011-125647 mailed Sep. 1, 2015.

* cited by examiner

COMPUTER-READABLE STORAGE MEDIUM, INFORMATION PROCESSING APPARATUS, INFORMATION PROCESSING SYSTEM, AND INFORMATION PROCESSING METHOD

CROSS REFERENCE TO RELATED APPLICATION

This application is a Continuation of U.S. application Ser. No. 13/326,736 filed Dec. 15, 2011, which in turns claims priority of Japanese Patent Application No. 2011-125647, filed on Jun. 3, 2011, the entire content of which is incorporated herein by reference.

FIELD

The exemplary embodiments relate to a computer-readable storage media, information processing apparatuses, information processing systems, and information processing methods, and particularly relate to computer-readable storage media, information processing apparatuses, information processing systems, and information processing methods that enable chat between users at distant locations.

BACKGROUND AND SUMMARY

Conventionally, there is known a game system that allows a user playing a network game to chat with another user playing the network game together with the user.

Further, there is conventionally known a communication system in which a communication space is provided in a message exchange device based on attribute information about a broadcast program sent from a broadcast station, messages are exchanged between terminal devices by means of the communication space, and an image of the broadcast program and information about the message exchange are displayed on screens of image display devices connected to the terminal devices.

In the above game system, however, not only a game image, but also an input box for inputting a character string desired to be transmitted to the other user, and a chat box for displaying a character string received from the other user, are displayed on a screen of a monitor. This makes it difficult to view the game image.

Also in the above communication system, since the image of the broadcast program and the information about the message exchange are displayed on the screens of the image display devices, it becomes difficult to view the broadcast program.

An object of the exemplary embodiments is to provide a computer-readable storage medium, an information processing apparatus, an information processing system, and an information processing method that allow, without affecting playing of a game or viewing of a television program, users at distant locations to communicate in real time with each other while viewing images displayed on screens as in the case of video chat and text chat.

The above object is attained by, for example, the following configurations.

A first aspect is a computer-readable storage medium having stored therein an information processing program executed in an information processing apparatus that is capable of displaying images on a stationary display device and on a portable display device having a predetermined input section, and that includes an input device and a communicator configured to communicate with another information processing apparatus (hereinafter, referred to as communication counterpart apparatus). The information processing program causes a computer of the information processing apparatus to function as a processor, a first display controller, a transmitter, a receiver, and a second display controller.

The processor executes a predetermined information process, based on an input from the input device. The first display controller causes an image which is based on the predetermined information process to be displayed on the stationary display device. The transmitter transmits, to the communication counterpart apparatus through the communicator, character information or a camera image inputted via the predetermined input section. The receiver receives, from the communication counterpart apparatus through the communicator, character information or a camera image inputted on the communication counterpart apparatus. The second display controller causes the character information or the camera image that is received by the receiver to be displayed on the portable display device.

The predetermined information process may be a game process.

Further, the transmitter may transmit game data for a network game process to the communication counterpart apparatus through the communicator, in addition to the character information or the camera image that is inputted via the predetermined input section. The receiver may receive game data for the network game process from the communication counterpart apparatus through the communicator, in addition to the character information or the camera image that is inputted on the communication counterpart apparatus. The processor may execute the network game process, based on the input from the input device and the game data that is received from the communication counterpart apparatus.

Further, the information processing apparatus may be connected to a first loudspeaker, the predetermined input section may include a camera and a microphone, and the portable display device may include a second loudspeaker. In addition, the transmitter may transmit, to the communication counterpart apparatus through the communicator, a camera image inputted via the camera and a microphone sound inputted via the microphone. The receiver may receive, from the communication counterpart apparatus through the communicator, a camera image and a microphone sound that are inputted on the communication counterpart apparatus. The information processing program may further cause the computer to function as a first sound controller and a second display controller. The first sound controller generates a game sound in accordance with the game process, and causes the game sound to be outputted from the first loudspeaker. The second sound controller causes the microphone sound that is received by the receiver to be outputted from the second loudspeaker.

Further, the second display controller may include: an image generator configured to generate an image to be displayed on the portable display device, based on the character information or the camera image that is received by the receiver; and an image outputter configured to output the image generated by the image generator to the portable display device by wireless transmission.

Further, the second display controller may include: an image generator configured to generate an image to be displayed on the portable display device, based on the character information or the camera image that is received by the receiver; and an image outputter configured to compress the image generated by the image generator, and to output the compressed image to the portable display device.

Further, the predetermined input section may include a touch panel, and the character information may be inputted by means of the touch panel.

Further, the stationary display device may have a function of receiving and displaying television broadcasts. In addition, the portable display device may have a function of outputting a control signal to the stationary display device in accordance with a channel selection instruction inputted through the predetermined input section, and thus switching television channels to be displayed on the stationary display device.

Further, the information processing apparatus may be communicable with a server device through the communicator. In addition, the information processing program may further cause the computer to function as an uploader, a downloader, and a communication counterpart determiner. The uploader uploads, into the server device, channel information indicating a television channel that a user of the information processing apparatus is viewing, and user identification information for identifying the user, in accordance with the channel selection instruction. The downloader downloads, from the server device, user identification information that is associated with the channel information uploaded by the uploader among user identification information uploaded from other information processing apparatuses into the server device. The communication counterpart determiner determines the communication counterpart apparatus, based on the user identification information downloaded by the downloader.

Further, the information processing apparatus may further include a storage section configured to store user identification information about users of other information processing apparatuses. In addition, the information processing program may further cause the computer to function as a communication counterpart determiner configured to determine the communication counterpart apparatus, based on the user identification information stored in the storage section about the users of the other information processing apparatuses.

Further, the communication counterpart determiner may select user identification information among the user identification information stored in the storage section about the users of the other information processing apparatuses, based on an input from the input device or the predetermined input section, and may determine, as the communication counterpart apparatus, another information apparatus that is associated with the selected user identification information.

Further, the predetermined input section may include a microphone, and the portable display device may include a loudspeaker. The transmitter may transmit a microphone sound inputted via the microphone, to the communication counterpart apparatus through the communicator, in addition to the character information or the camera image. The receiver may receive a microphone sound inputted on the communication counterpart apparatus, from the communication counterpart apparatus through the communicator, in addition to the character information or the camera image that is inputted on the communication counterpart apparatus. The information processing program may further cause the computer to function as a sound controller configured to cause the microphone sound that is received by the receiver to be outputted from the loudspeaker.

A second aspect is an information processing apparatus that is capable of displaying images on a stationary display device and on a portable display device having a predetermined input section. The information processing apparatus includes: an input device; a communicator configured to communicate with another information processing apparatus (hereinafter, referred to as communication counterpart apparatus); a processor configured to execute a predetermined information process, based on an input from the input device; a first display controller configured to cause an image which is based on the predetermined information process to be displayed on the stationary display device; a transmitter configured to transmit, to the communication counterpart apparatus through the communicator, character information or a camera image inputted via the predetermined input section; a receiver configured to receive, from the communication counterpart apparatus through the communicator, character information or a camera image inputted on the communication counterpart apparatus; and a second display controller configured to cause the character information or the camera image that is received by the receiver to be displayed on the portable display device.

A third aspect is an information processing system that is capable of displaying images on a stationary display device and on a portable display device having a predetermined input section. The information processing system includes: an input device; a communicator configured to communicate with another information processing system (hereinafter, referred to as communication counterpart system); a processor configured to execute a predetermined information process, based on an input from the input device; a first display controller configured to cause an image which is based on the predetermined information process to be displayed on the stationary display device; a transmitter configured to transmit, to the communication counterpart system through the communicator, character information or a camera image inputted via the predetermined input section; a receiver configured to receive, from the communication counterpart system through the communicator, character information or a camera image inputted on the communication counterpart system; and a second display controller configured to cause the character information or the camera image that is received by the receiver to be displayed on the portable display device.

A fourth aspect is an information processing method performed by an information processing apparatus that is capable of displaying images on a stationary display device and on a portable display device having a predetermined input section, and that includes an input device and a communicator configured to communicate with another information processing apparatus (hereinafter, referred to as communication counterpart apparatus). The information processing method comprises the steps of: executing a predetermined information process, based on an input from the input device; causing an image which is based on the predetermined information process to be displayed on the stationary display device; transmitting, to the communication counterpart apparatus through the communicator, character information or a camera image inputted via the predetermined input section; receiving, from the communication counterpart apparatus through the communicator, character information or a camera image inputted on the communication counterpart apparatus; and causing the character information or the camera image that is received from the communication counterpart apparatus to be displayed on the portable display device.

The exemplary embodiments described herein allow, without affecting playing of a game or viewing of a television program, users at distant locations to communicate in real time with each other while viewing images displayed on screens as in the case of video chat and text chat.

These and other objects, features, aspects and advantages of the exemplary embodiments will become more apparent from the following detailed description when taken in conjunction with the accompanying drawings.

DETAILED DESCRIPTION OF NON-LIMITING EXAMPLE EMBODIMENTS

First Embodiment

A game system according to an embodiment (first embodiment) will be described with reference to FIG. 1.

Figure 1:
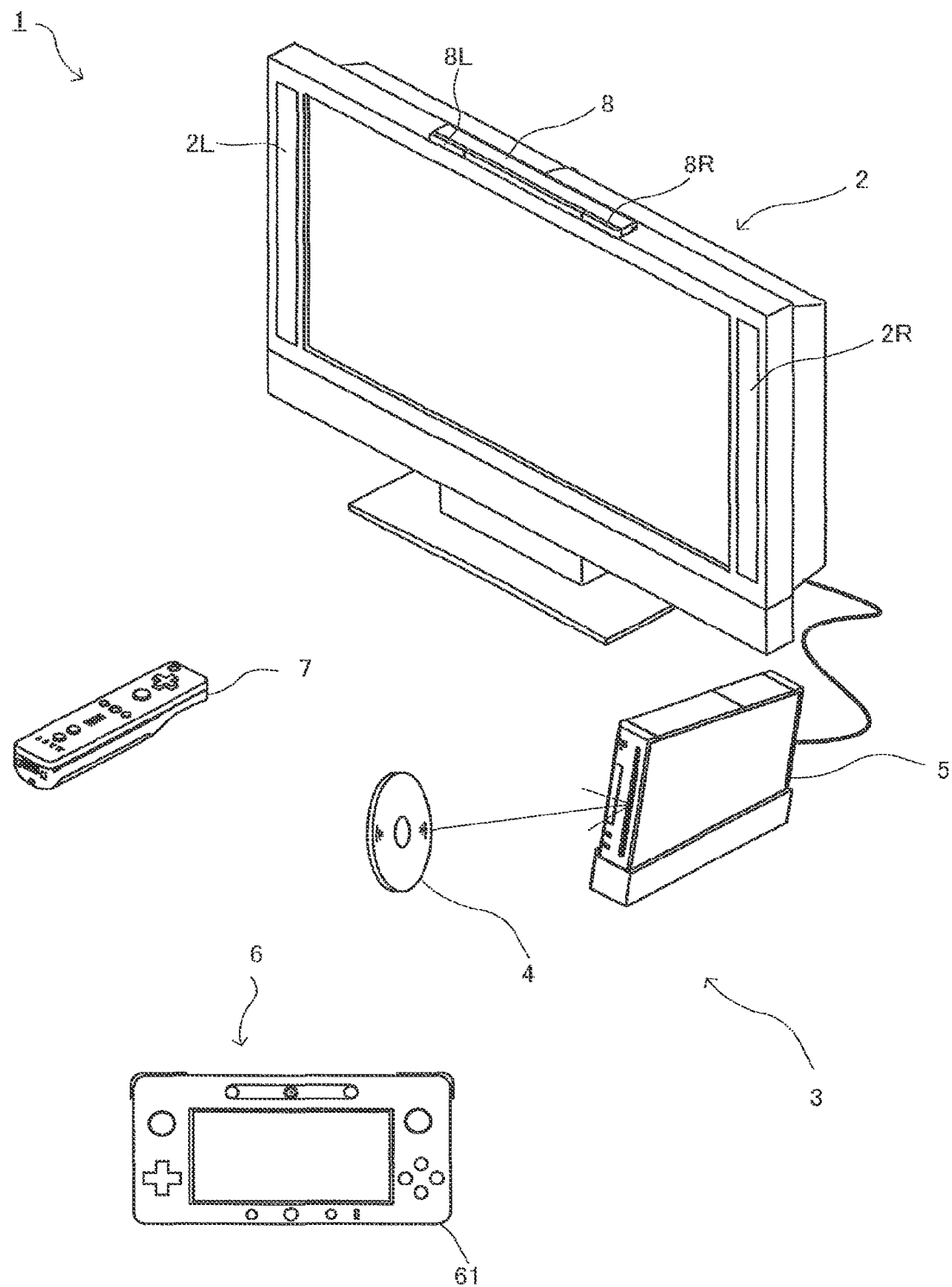
FIG. 1 is an external view showing a non-limiting example of a game system 1 according to an embodiment.

In FIG. 1, a game system 1 includes a household television receiver (hereinafter, referred to as a monitor) 2 which is an example of display means, and a stationary game apparatus 3 connected to the monitor 2 via a connection cord. The game apparatus 3 includes an optical disc 4, a game apparatus body 5, a terminal device 6, and a controller 7.

The optical disc 4 has stored therein an information processing program (typically, a game program) to be executed by the game apparatus body 5.

The monitor 2 displays a game image outputted from the game apparatus body 5. The monitor 2 includes loudspeakers 2R and 2L. The loudspeakers 2R and 2L, each output a game sound outputted from the game apparatus body 5.

The game apparatus body 5 executes a game process and the like based on, for example, the game program stored in the optical disc 4.

The controller 7 includes a plurality of operation sections (operation buttons). The controller 7 transmits, to the game apparatus body 5, operation data (controller operation data) representing input states of the operation sections (whether or not each of the operation buttons has been pressed), by using, for example, the Bluetooth (registered trademark) technology.

The controller 7 includes an imaging section for taking an image of a marker 8 consisting of two LED modules (hereinafter, referred to as "markers") 8L and 8R provided in the vicinity of the display screen of the monitor 2 (above the screen in FIG. 1), and an imaging information calculation section for calculating the position of the marker in an image taken by the imaging section. The position of the marker calculated by the imaging information calculation section is transmitted as marker coordinate data to the game apparatus body 5. The game apparatus body 5 can calculate the movement, position, attitude and the like of the controller 7, based on the marker coordinate data.

In addition, the controller 7 includes an acceleration sensor and a gyro sensor. Acceleration data representing accelerations detected by the acceleration sensor, and angular velocity data representing angular velocities detected by the gyro sensor, are transmitted to the game apparatus body 5. The game apparatus body 5 can calculate the direction and movement of the controller 7, based on the acceleration data and/or the angular velocity data.

The terminal device 6 is a portable device that is small enough to be held by a user, and the user is allowed to move the terminal device 6 with hands, or place the terminal device 6 at any location. Although a specific structure of the terminal device 6 will be described later, the terminal device 6 includes an LCD (Liquid Crystal Display) 61 as display means, and input means (a touch panel 62, a gyro sensor 604, and the like described later). The terminal device 6 and the game apparatus body 5 (a terminal communication module 28 (see FIG. 2)) are communicable with each other wirelessly or via a cable. The terminal device 6 receives, from the game apparatus body 5, data of an image (e.g., a game image) generated in the game apparatus body 5, and displays the image represented by the data on an LCD 61. Although in the exemplary embodiment an LCD is used as a display device, the terminal device 6 may include any other display device, such as a display device utilizing EL (Electro Luminescence), for example. Further, the terminal device 6 transmits, to the game apparatus body 5, operation data representing the content of an operation performed on the terminal device 6.

Figure 2:
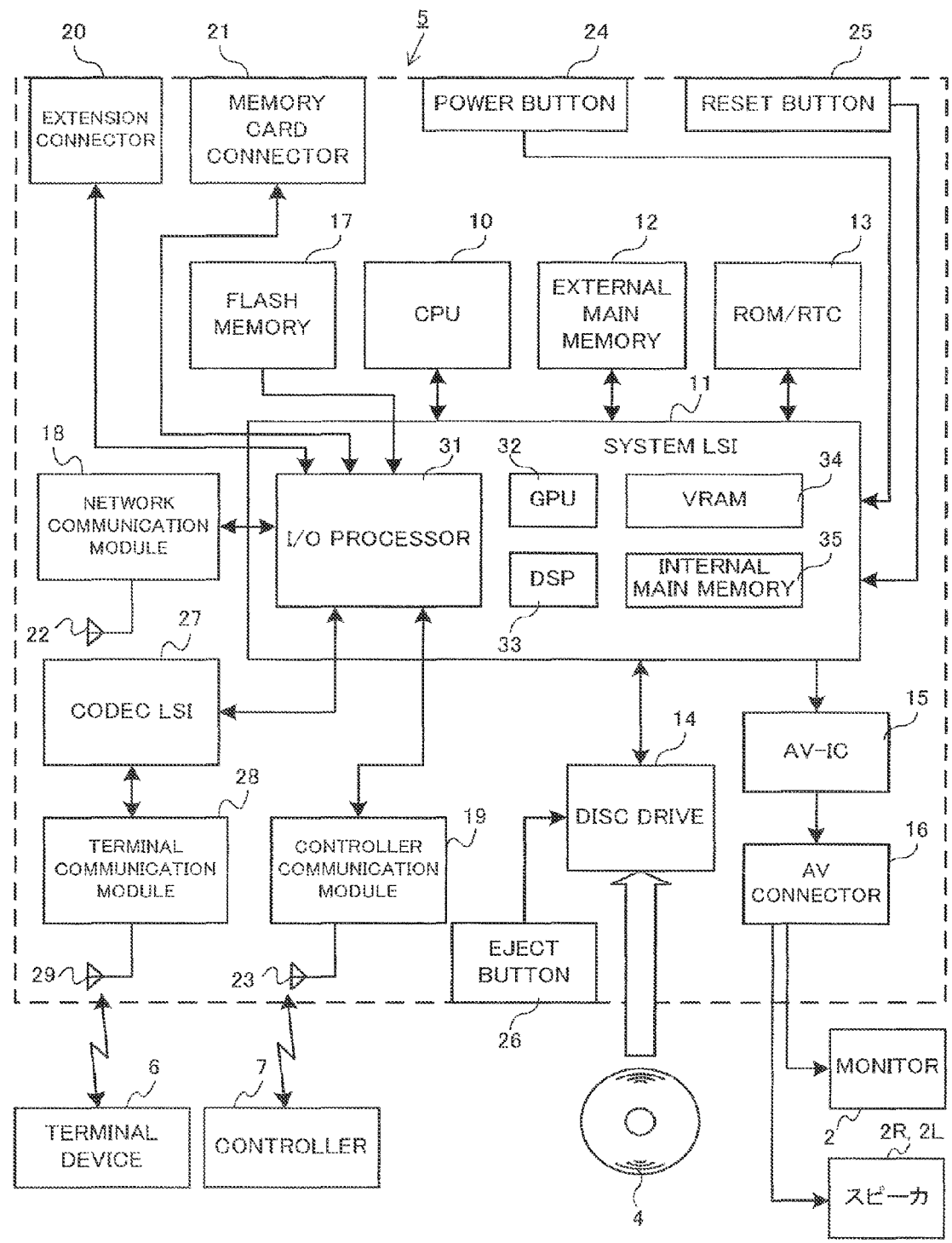
FIG. 2 is a functional block diagram showing a non-limiting example of a game apparatus body 5 shown in FIG. 1.

Next, with reference to FIG. 2, an internal structure of the game apparatus body 5 will be described. FIG. 2 is a block diagram illustrating an example of an internal structure of the game apparatus body 5. The game apparatus body 5 includes a CPU (Central Processing Unit) 10, a system LSI (Large Scale Integration) 11, an external main memory 12, a ROM/RTC (Read Only Memory/Real Time Clock) 13, a disc drive 14, an AV-IC (Audio Video-Integrated Circuit) 15 and the like.

The CPU 10 is connected to the system LSI 11. In addition to the CPU 10, the external main memory 12, the ROM/RTC 13, the disc drive 14, and the AV-IC 15 are connected to the system LSI 11. The external main memory 12, which is a volatile memory, is used as a work area and a buffer area for the CPU 10. The ROM/RTC 13 includes a ROM (so-called boot ROM) incorporating a program for booting the game apparatus body 5, and a clock circuit (RTC) for counting time. The disc drive 14 reads, from the optical disc 4, program data, texture data and the like, and writes the read data into an internal main memory 35 described below or the external main memory 12.

The system LSI 11 includes an input/output processor (I/O processor) 31, a GPU (Graphics Processor Unit) 32, a DSP (Digital Signal Processor) 33, a VRAM (Video RAM) 34, and the internal main memory 35.

The GPU 32 generates an image in accordance with a graphics command (draw command) issued by the CPU 10. In the exemplary embodiment, the game apparatus body 5 may generate both a game image to be displayed on the monitor 2 and a game image to be displayed on the terminal device 6. Hereinafter, the game image to be displayed on the monitor 2 may be referred to as a "monitor game image", and the game image to be displayed on the terminal device 6 may be referred to as a "terminal game image".

The DSP 33, serving as an audio processor, generates sound data by using sound data and sound waveform (tone quality) data stored in the internal main memory 35 and the external main memory 12. In the exemplary embodiment, similarly to the game images, both a game sound to be outputted from the loudspeakers 2R and 2L, of the monitor 2 and a game sound to be outputted from the loudspeakers of the terminal device 6 may be generated. Hereinafter, the game sound to be outputted from the monitor 2 may be referred to as a "monitor game sound", and the game sound to be outputted from the terminal device 6 may be referred to as a "terminal game sound".

Among the image data and sound data generated by the game apparatus body 5 as described above, the image data and sound data to be outputted to the monitor 2 are read by the AV-IC 15. Through an AV connector 16, the AV-IC 15 outputs the read image data to the monitor 2, and outputs the read sound data to the loudspeakers 2R and 2L included in the monitor 2. Thereby, an image is displayed on the monitor 2, and a sound is outputted from the loudspeakers 2R and 2L.

Further, among the image data and sound data generated by the game apparatus body 5, the image data and sound data to be outputted to the terminal device 6 are transmitted to the terminal device 6 by the I/O processor 31 or the like. Data transmission to the terminal device 6 by the I/O processor 31 or the like will be described later.

The I/O processor 31 executes data reception and transmission with the components connected thereto, and download of data from an external apparatus. The I/O processor 31 is connected to the flash memory 17, the network communication module 18, the controller communication module 19, an extension connector 20, a memory card connector 21, and a codec LSI 27. The codec LSI 27 is connected to the terminal communication module 28.

The game apparatus body 5 is connected to a network such as the Internet so as to communicate with external information processing apparatuses (for example, other game apparatuses or various servers). That is, the I/O processor 31 is connected to a network via the network communication module 18 and the antenna 22 so as to communicate with external information processing apparatuses connected to the network. The flash memory 17 may store not only the data transmitted and received between the game apparatus body 5 and the external information processing apparatuses, but also saved data (result data or progress data of the process) of the game played with the game apparatus body 5. Further, the flash memory 17 may store programs such as a game program.

The game apparatus body 5 can receive operation data from the controller 7. That is, the I/O processor 31 receives, via the antenna 23 and the controller communication module 19, operation data or the like transmitted from the controller 7, and stores (temporarily) the data in a buffer area of the internal main memory 35 or the external main memory 12.

The game apparatus body 5 is capable of transmitting/receiving image data, sound data and the like to/from the terminal device 6. The I/O processor 31 outputs data of a game image (terminal game image) generated by the GPU 32 to the codec LSI 27. The codec LSI 27 performs a predetermined compression process on the image data supplied from the I/O processor 31. The terminal communication module 28 performs wireless communication with the terminal device 6. Accordingly, the image data compressed by the codec LSI 27 is transmitted by the terminal communication module 28 to the terminal device 6 via the antenna 29. In the exemplary embodiment, the codec LSI 27 compresses the image data by using a highly efficient compression technique, for example, the H.264 standard. The codec LSI 27 may adopt other compression techniques. When the communication rate is sufficiently high, uncompressed image data may be transmitted. The terminal communication module 28 is, for example, a Wi-Fi certified communication module. The terminal communication module 28 may perform wireless communication with the terminal device 6 at a high speed by using, for example, the technique of MIMO (Multiple Input Multiple Output) adopted in the IEEE802.11n standard, or may use other communication techniques.

The game apparatus body 5 transmits, to the terminal device 6, sound data as well as the image data. That is, the I/O processor 31 outputs sound data (terminal game sound) generated by the DSP 33 to the terminal communication module 28 via the codec LSI 27. The codec LSI 27 performs a compression process on the sound data in a similar manner to that for the image data. Any compression technique may be adopted for the sound data. In another embodiment, uncompressed sound data may be transmitted. The terminal communication module 28 transmits the compressed image data and sound data to the terminal device 6 via the antenna 29.

The game apparatus body 5 transmits, in addition to the image data and sound data, various control data to the terminal device 6, according to need. The control data represent control instructions for the components included in the terminal device 6, such as an instruction to control on/off of a marker section (a marker section 65 shown in FIG. 5), and an instruction to control image taking of a camera (a camera 66 shown in FIG. 5). The I/O processor 31 transmits the control data to the terminal device 6 in response to an instruction from the CPU 10.

The game apparatus body 5 can receive various data from the terminal device 6. Although details will be described later, in the exemplary embodiment, the terminal device 6 transmits operation data, image data, and sound data. The respective data transmitted from the terminal device 6 are received by the terminal communication module 28 via the antenna 29. The image data and sound data transmitted from the terminal device 6 have been subjected to a compression process similar to that for the image data and sound data transmitted from the game apparatus body 5 to the terminal device 6. Accordingly, these image data and sound data are transmitted from the terminal communication module 28 to the codec LSI 27, and subjected to a decompression process by the codec LSI 27. The decompressed data are outputted to the I/O processor 31. The operation data, which has been received by the terminal communication module 28, is outputted to the I/O processor 31 via the codec LSI 27. The I/O processor 31 stores (temporarily) the data received from the terminal device 6 in the buffer area of the internal main memory 35 or the external main memory 12.

The game apparatus body 5 is connectable to other devices and external storage media via the extension connector 20 and the memory card connector 21.

The game apparatus body 5 includes (on the front main surface thereof, for example) a power button 24, a reset button 25, an insertion slot in which the optical disc 4 is inserted, an eject button 26 for ejecting the optical disc 4 from the insertion slot of the game apparatus body 5, and the like.

In another embodiment, some of the components of the game apparatus body 5 may be constituted as an extension device separated from the game apparatus body 5. In this case, the extension device may be connected to the game apparatus body 5 via the extension connector 20. Specifically, the extension device may include, for example, the codec LSI 27, the terminal communication module 28, and the antenna 29, and may be detachably connected to the extension connector 20. Thus, by connecting the extension device to the game apparatus body which does not have the above-mentioned components, the game apparatus body can be made communicable with the terminal device 6.

Figure 3:
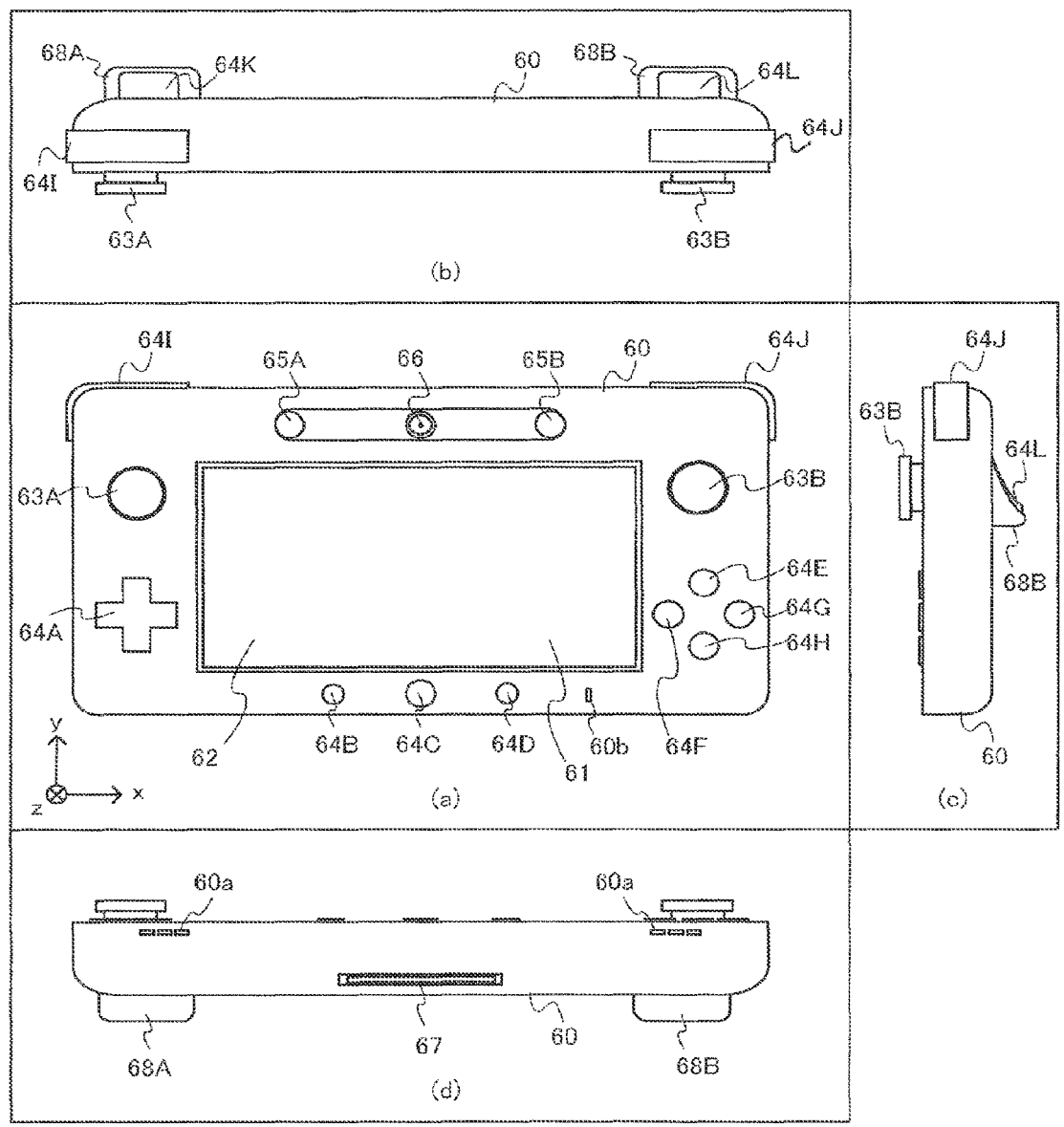
FIG. 3 shows a non-limiting example of an external structure of a terminal device 6 shown in FIG. 1.
Figure 4:
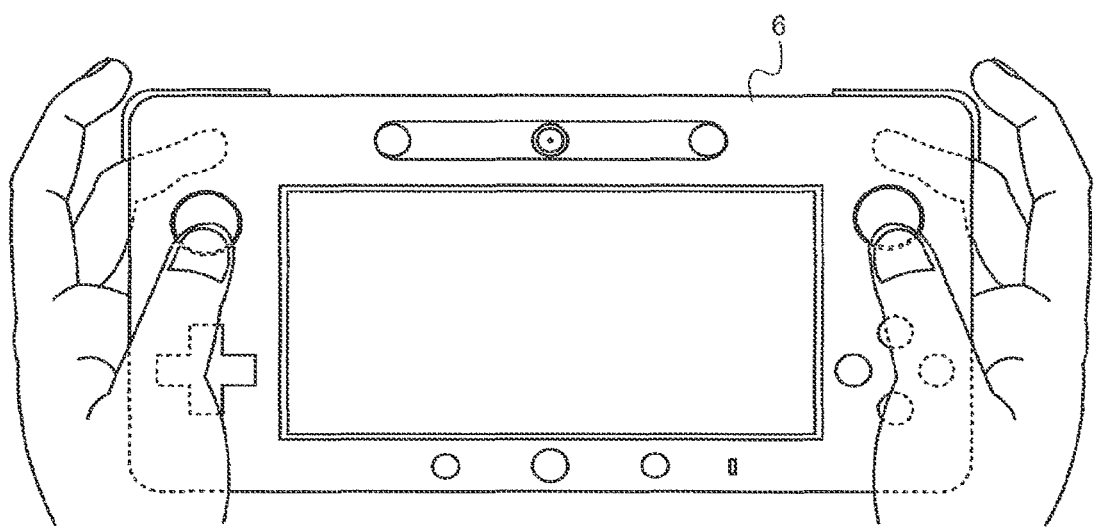
FIG. 4 shows a non-limiting example of a state in which a user holds the terminal device 6.
Figure 5:
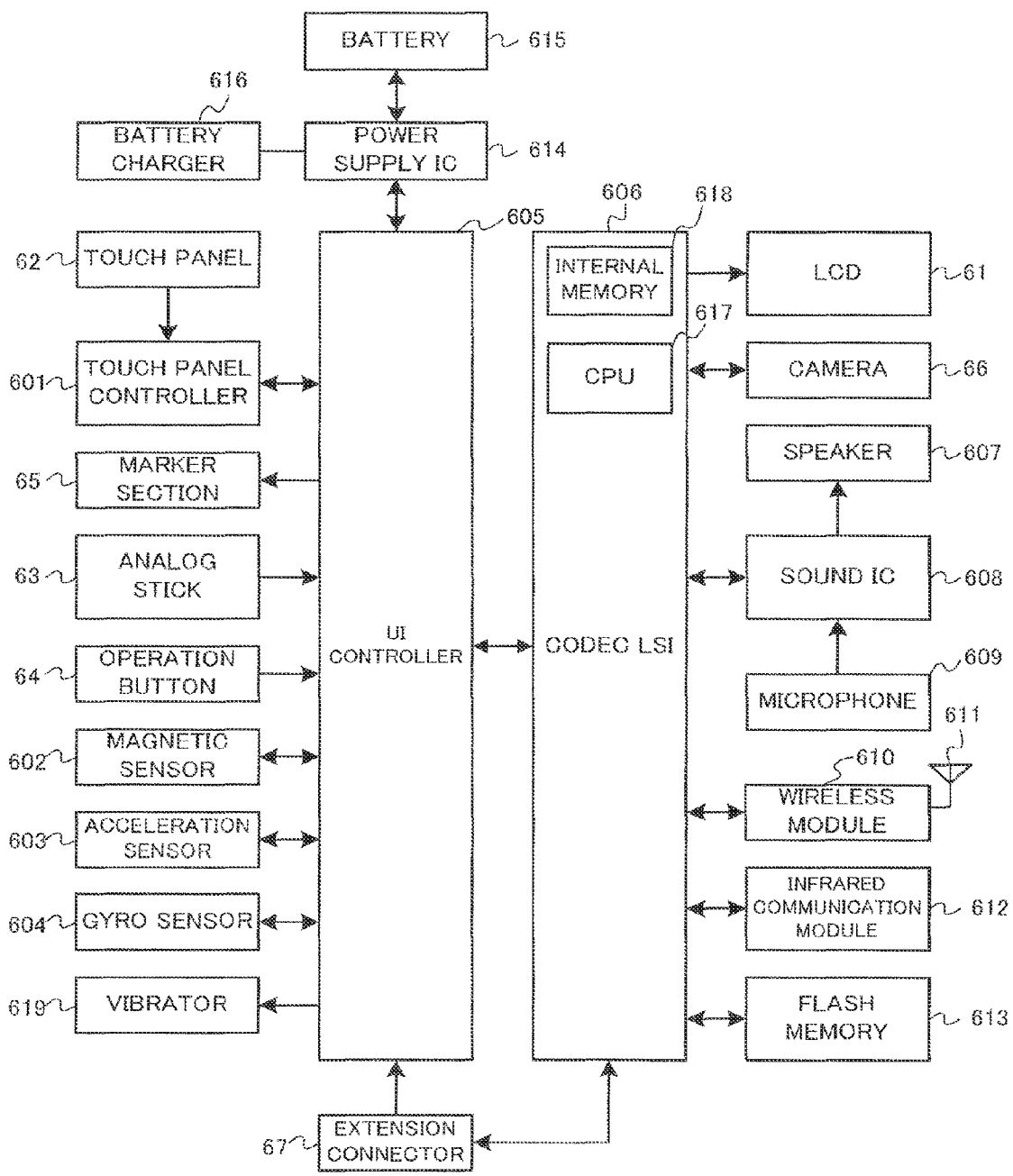
FIG. 5 is a block diagram showing a non-limiting example of an internal structure of the terminal device 6 shown in FIG. 3.

Next, a structure of the terminal device 6 will be described with reference to FIGS. 3 to 5. FIG. 3 is a diagram illustrating an example of an external structure of the terminal device 6. More specifically, (a) of FIG. 3 is a front view of the terminal device 6, (b) of FIG. 3 is a top view, (c) of FIG. 3 is a right side view, and (d) of FIG. 3 is a bottom view. FIG. 4 shows an example of a state in which a user holds the terminal device 6 with both hands.

As shown in FIG. 3, the terminal device 6 includes a housing 60 which generally has a horizontally long plate-like rectangular shape. The housing 60 is small enough to be held by the user.

The terminal device 6 includes the LCD 61 on a front surface of the housing 60. The LCD 61 is provided near the center of the front surface of the housing 60. Therefore, as shown in FIG. 4, the user, holding the housing 60 at portions to the right and left of the LCD 61, is allowed to move the terminal device 6 while viewing a screen of the LCD 61.

As shown in (a) of FIG. 3, the terminal device 6 includes, as operation means, a touch panel 62 on the screen of the LCD 61. In the exemplary embodiment, the touch panel 62 is, but is not limited to, a resistive film type touch panel. A touch panel of any type, such as electrostatic capacitance type, may be used. The touch panel 62 may be of single touch type or multiple touch type. In the exemplary embodiment, the touch panel 62 has the same resolution (detection accuracy) as that of the LCD 61. However, the resolution of the touch panel 62 and the resolution of the LCD 61 may not necessarily be the same. Since the terminal device 6 has the touch panel 62, the user is allowed to operate the touch panel 62 while moving the terminal device 6. That is, the user is allowed to directly (by using the touch panel 62) perform an input onto the screen of the LCD 61 while moving the LCD 61.

As shown in FIG. 3, the terminal device 6 has, as operation means, two analog sticks 63A and 63B, and a plurality of operation buttons 64A to 64I. The analog sticks 63A and 63B are each a device for designating a direction. The analog sticks 63A and 63B are each configured such that a stick part thereof to be operated by a finger of the user is slidable or tiltable in any direction (at any angle in any direction such as the upward, the downward, the rightward, the leftward, or the diagonal direction) with respect to the front surface of the housing 60.

The operation buttons 64A to 64L are each assigned a function, as appropriate, in accordance with a game program. For example, the cross button 64A may be used for direction designation operation, selection operation, and the like, and the operation buttons 64E to 64H may be used for determination operation, cancellation operation, and the like.

As shown in (a) of FIG. 3, the terminal device 6 includes a marker section (the marker section 65 shown in FIG. 5) including a marker 65A and a marker 65B, on the front surface of the housing 60. The markers 65A and 65B are each constituted by one or more infrared LEDs. The marker section 65 is used, like the marker 8, for causing the game apparatus body 5 to calculate a movement or the like of the controller 7 with respect to the marker section 65. The game apparatus body 5 is capable of controlling the infrared LEDs of the marker section 65 to be on or off.

The terminal device 6 includes a camera 66. The camera 66 is provided on the front surface of the housing 60. Accordingly, the camera 66 is capable of taking an image of the face of the user holding the terminal device 6. For example, the camera 66 is capable of taking an image of the user playing a game while viewing the LCD 61.

The terminal device 6 has a microphone (a microphone 609 shown in FIG. 5) as sound input means. The microphone 609 is embedded in the housing 60 at a position inside a microphone hole 60b. The microphone 609 detects for a sound, such as the user's voice, around the terminal device 6.

The terminal device 6 has loudspeakers (loudspeakers 607 shown in FIG. 5) as sound output means. A sound from the loudspeakers 607 is outputted through speaker holes 60a provided in the lower side surface of the housing 60.

The terminal device 6 further includes an extension connector 67 for connecting another device to the terminal device 6.

In the terminal device 6 shown in FIG. 3, the shapes of the operation buttons and the housing 60, the number of each of the components, and the positions at which the components are provided are merely examples. The shapes, numbers, and positions may be different from those described above.

Next, an internal structure of the terminal device 6 will be described with reference to FIG. 5. FIG. 5 is a block diagram illustrating an example of an internal structure of the terminal device 6. As shown in FIG. 5, the terminal device 6 includes, in addition to the components shown in FIG. 3, a touch panel controller 601, a magnetic sensor 602, an acceleration sensor 603, the gyro sensor 604, a user interface controller (UI controller) 605, a codec LSI 606, the loudspeakers 607, a sound IC 608, the microphone 609, a wireless module 610, an antenna 611, an infrared communication module 612, a flash memory 613, a power supply IC 614, a battery 615, and a vibrator 619. These electronic components are mounted on an electronic circuit board and accommodated in the housing 60.

The UI controller 605 is a circuit for controlling data input to various input/output sections and data outputted from various input/output sections. The UI controller 605 is connected to the touch panel controller 601, the analog stick 63 (the analog sticks 63A and 63B), the operation button 64 (the operation buttons 64A to 64L), the marker section 65, the magnetic sensor 602, the acceleration sensor 603, the gyro sensor 604, and the vibrator 619. Further, the UI controller 605 is connected to the codec LSI 606 and the extension connector 67. The power supply IC 614 is connected to the UI controller 605, so that power is supplied to each of the components through the UI controller 605. An internal battery 615 is connected to the power supply IC 614, so that power is supplied from the battery 615. Further, a battery charger 616 or a cable, which is supplied with power from an external power supply, may be connected to the power supply IC 614 via a connector or the like. In this case, the terminal device 6 can be supplied with power and charged from the external power supply by using the battery charger 616 or the cable.

The touch panel controller 601 is a circuit which is connected to the touch panel 62 and controls the touch panel 62. The touch panel controller 601 generates a predetermined form of touch position data, based on a signal from the touch panel 62, and outputs the touch position data to the UI controller 605. The touch position data represents coordinates of a position at which an input is performed on an input surface of the touch panel 62. The touch panel controller 601 reads a signal from the touch panel 62 and generates touch position data every predetermined period of time. Further, various control instructions are outputted from the UI controller 605 to the touch panel controller 601.

The analog stick 63 outputs, to the UI controller 605, stick data representing a direction in which the stick part slides (or tilts), and the amount of the sliding (tilting). The operation button 64 outputs, to the UI controller 605, operation button data representing an input state of each of the operation buttons 64A to 64L (whether or not the operation button has been pressed).

The magnetic sensor 602 detects the magnitude and direction of a magnetic field to detect an orientation. Orientation data representing the detected orientation is outputted to the UI controller 605. The UI controller 605 outputs, to the magnetic sensor 602, a control instruction for the magnetic sensor 602. Examples of the magnetic sensor 602 include: an MI (Magnetic Impedance) sensor, a fluxgate sensor, a hall sensor, a GMR (Giant Magneto Resistance) sensor, a TMR (Tunneling Magneto resistance) sensor, and an AMR (Anisotropic Magneto Resistance) sensor. However, any sensor may be adopted as long as the sensor can detect an orientation.

The acceleration sensor 603 is provided inside the housing 60. The acceleration sensor 603 detects the magnitudes of linear accelerations along three axial directions (xyz axial directions shown in (a) of FIG. 3). Acceleration data representing the detected accelerations is outputted to the UI controller 605. The UI controller 605 outputs, to the acceleration sensor 603, a control instruction for the acceleration sensor 603.

The gyro sensor 604 is provided inside the housing 60. The gyro sensor 604 detects the angular velocities around the three axes (the above-described xyz axes). Angular velocity data representing the detected angular velocities is outputted to the UI controller 605. The UI controller 605 outputs, to the gyro sensor 604, a control instruction for the gyro sensor 604.

The vibrator 619 is, for example, a vibration motor or a solenoid. The terminal device 6 is vibrated by actuating the vibrator 619 in accordance with a control instruction outputted from the UI controller 605 to the vibrator 619.

The UI controller 605 outputs, to the codec LSI 606, the operation data (hereinafter referred to as terminal operation data) including the touch position data, the stick data, the operation button data, the orientation data, the acceleration data, and the angular velocity data, which have been received from the respective components.

The codec LSI 606 is a circuit for performing a compression process on data to be transmitted to the game apparatus body 5, and a decompression process on data transmitted from the game apparatus body 5. The LCD 61, the camera 66, the sound IC 608, the wireless module 610, the flash memory 613, and the infrared communication module 612 are connected to the codec LSI 606. The codec LSI 606 further includes a CPU 617 and an internal memory 618. Although the terminal device 6 is configured not to perform a game process, the terminal device 6 may execute a program for managing the terminal device 6 or a program for communication. For example, a program stored in the flash memory 613 is loaded into the internal memory 618 and executed by the CPU 617 when the terminal device 6 is powered on, whereby the terminal device 6 is started up. A part of the area of the internal memory 618 is used as a VRAM for the LCD 61.

The camera 66 takes an image in accordance with an instruction from the game apparatus body 5, and outputs data of the taken image to the codec LSI 606. The codec LSI 606 outputs, to the camera 66, a control instruction for the camera 66, such as an instruction to take an image. The camera 66 is also capable of taking a moving picture. That is, the camera 66 is capable of repeatedly performing image taking, and repeatedly outputting image data to the codec LSI 606.

The sound IC 608 is a circuit for controlling input of sound data from the microphone 609 and output of sound data to the loudspeakers 607.

The codec LSI 606 transmits the image data from the camera 66, the sound data from the microphone 609, and the terminal operation data from the UI controller 605, to the game apparatus body 5 through the wireless module 610. In the exemplary embodiment, the codec LSI 606 subjects the image data and the sound data to a compression process similar to that performed by the codec LSI 27. The compressed image data and sound data, and the terminal operation data are outputted to the wireless module 610 as transmission data. The antenna 611 is connected to the wireless module 610, and the wireless module 610 transmits the transmission data to the game apparatus body 5 through the antenna 611. The wireless module 610 has the same function as that of the terminal communication module 28 of the game apparatus body 5. That is, the wireless module 610 has a function of connecting to a wireless LAN by a method based on, for example, the IEEE802.11n standard.

As described above, the transmission data transmitted from the terminal device 6 to the game apparatus body 5 includes the terminal operation data, the image data, and the sound data. If another device is connected to the terminal device 6 through the extension connector 67, data received from the other device may be included in the transmission data. The infrared communication module 612 performs, with another device, infrared communication based on, for example, the IRDA standard. The codec LSI 606 may transmit, to the game apparatus body 5, the transmission data that includes data received by the infrared communication, according to need.

As described above, the compressed image data and sound data are transmitted from the game apparatus body 5 to the terminal device 6. These data are received by the codec LSI 606 via the antenna 611 and the wireless module 610. The codec LSI 606 decompresses the received image data and sound data. The decompressed image data is outputted to the LCD 61, and an image represented by the image data is displayed on the LCD 61. On the other hand, the decompressed sound data is outputted to the sound IC 608, and a sound represented by the sound data is outputted from the loudspeakers 607.

When control data is included in the data received from the game apparatus body 5, the codec LSI 606 and the UI controller 605 make control instructions for the respective components, according to the control data. As described above, the control data represents control instructions for the respective components (in the exemplary embodiment, the camera 66, the touch panel controller 601, the marker section 65, the sensors 602 to 604, the vibrator 619, and the infrared communication module 612) included in the terminal device 6. In the exemplary embodiment, possible examples of the control instructions represented by the control data are instructions to start and halt (stop) the operations of the above-mentioned components. That is, some components which are not used for a game may be halted to reduce power consumption. In this case, data from the halted components are not included in the transmission data transmitted from the terminal device 6 to the game apparatus body 5.

Next, an outline of information processing executed in the game system 1 will be described with reference to FIG. 6 to FIG. 15.

Figure 6:
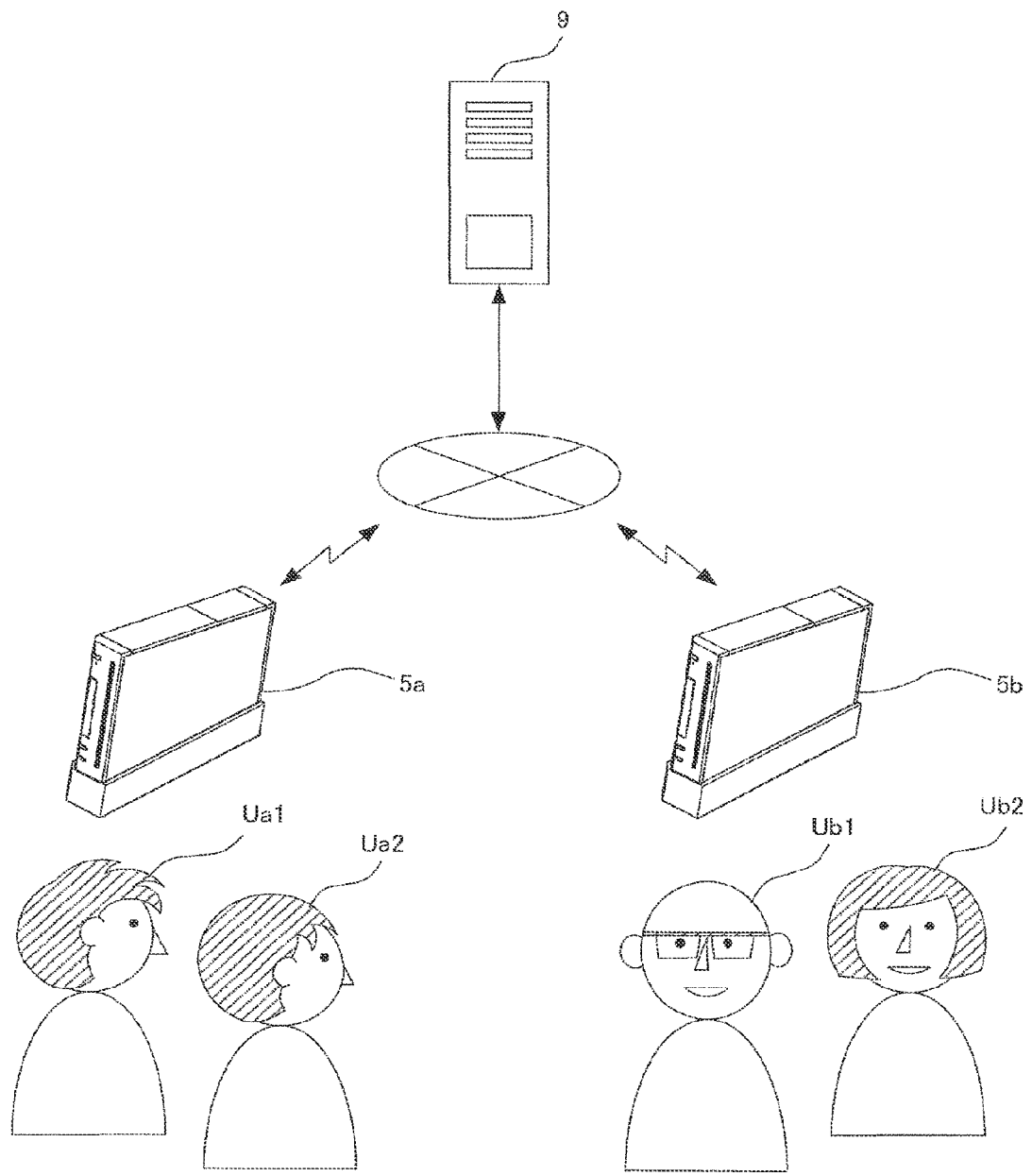
FIG. 6 shows a non-limiting example of a state in which a plurality of game apparatus bodies are connected to each other through a network.

The game apparatus body 5 in the game system 1 can communicate with another game apparatus body via, for example, the Internet. In FIG. 6, for example, a game apparatus body 5a can communicate with another game apparatus body 5b and a server device 9 which are connected to the Internet. The game apparatus body 5a and the game apparatus body 5b can transmit and receive game data needed for a game to and from each other. Accordingly, users (a user Ua1 and/or a user Ua2) of the game apparatus body 5a and users (a user Ub1 and/or a user Ub2) of the game apparatus body 5b can play a game together.

In the description below, "a" is appended to the reference characters indicating components of a game system that includes the game apparatus body 5a shown in FIG. 6, while "b" is appended to the reference characters indicating components of a game system that includes the game apparatus body 5b shown in FIG. 6, according to need.

Figure 7:
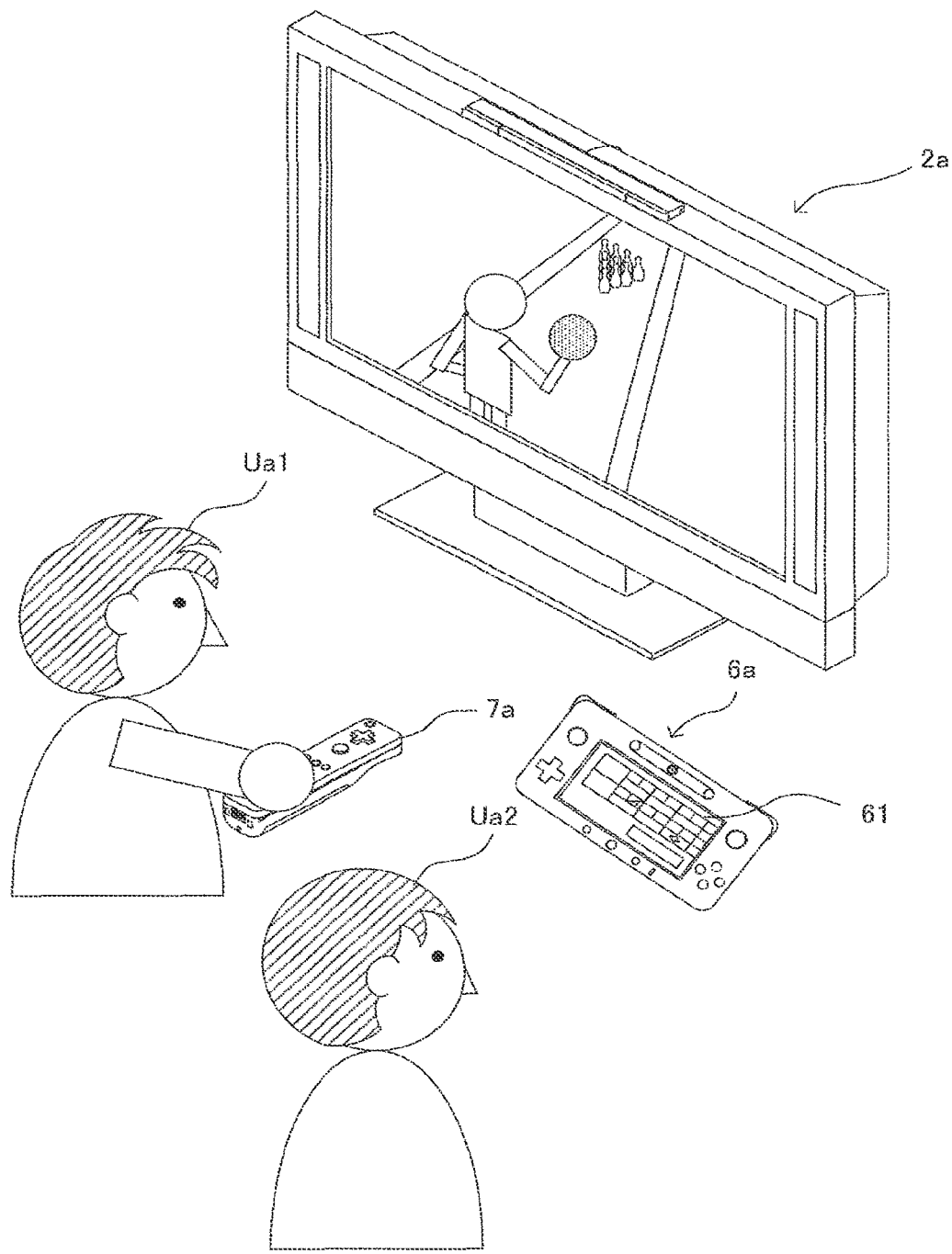
FIG. 7 shows non-limiting examples of images that are displayed on a monitor 2 and an LCD 61 when a network game is being played.

FIG. 7 illustrates a state of the game system that includes the game apparatus body 5a when the user (user Ua1) of the game apparatus body 5a and the user (user Ub1) of the game apparatus body 5b are playing a bowling game together.

In FIG. 7, a main game image is displayed on a monitor 2a. A character holding a bowling ball is displayed in the main game image. The user Ua1 can operate the character by using a controller 7a.

Meanwhile, a sub game image is displayed on an LCD 61 of a terminal device 6a. The main game image is an image essential for playing of the game, whereas the sub game image is not essential for playing of the game. The sub game image is an image for providing various information about the game to the users. In the example of FIG. 7, scores of the bowling game are displayed on the LCD 61 of the terminal device 6a.

Figure 8:
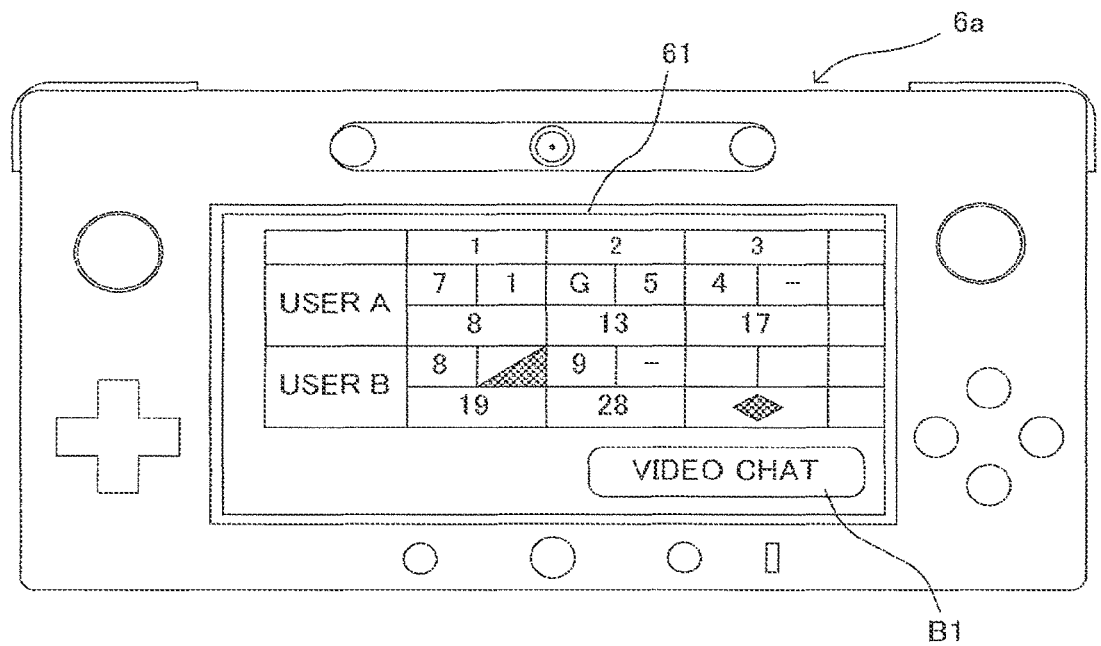
FIG. 8 shows a non-limiting example of a terminal game image displayed on the LCD 61.

As shown in FIG. 8, the sub game image displayed on the LCD 61 includes a video chat start button B1 for making an instruction to start video chat. The user Ua2 can have video chat with the user (user Ub2) of the game apparatus body 5b by touching the video chat start button B1.

Figure 9:
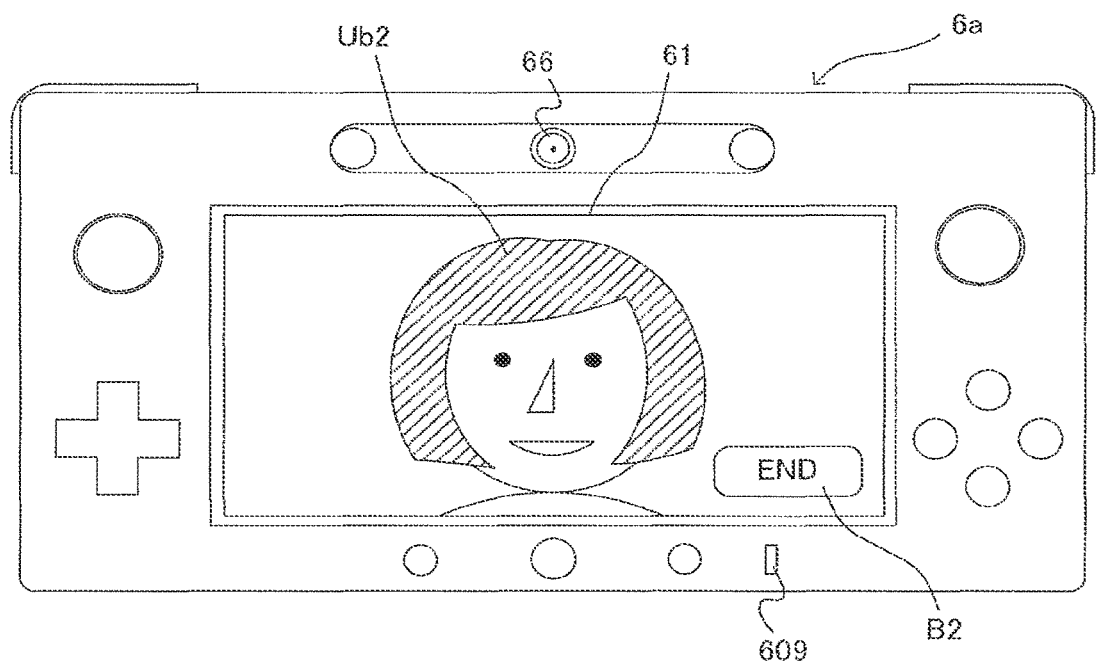
FIG. 9 shows a non-limiting example of a video chat image displayed on the LCD 61.

When the user Ua2 touches the video chat start button B1, the face of the user Ub2 is displayed in real time on the LCD 61 of the terminal device 6a, as shown in FIG. 9. In addition, the voice of the user Ub2 is outputted in real time from loudspeakers 607 of the terminal device 6a. Meanwhile, image data (camera image) inputted from a camera 66 of the terminal device 6a, and sound data (microphone sound) inputted from a microphone 609 of the terminal device 6a are transmitted to the game apparatus body 5b through the game apparatus body 5a. Accordingly, the face of the user Ua2 is displayed in real time on an LCD 61 of a terminal device 6b in the game system that includes the game apparatus body 5b, and the voice of the user Ua2 is outputted in real time from loudspeakers 607 of the terminal device 6b.

Figure 10:
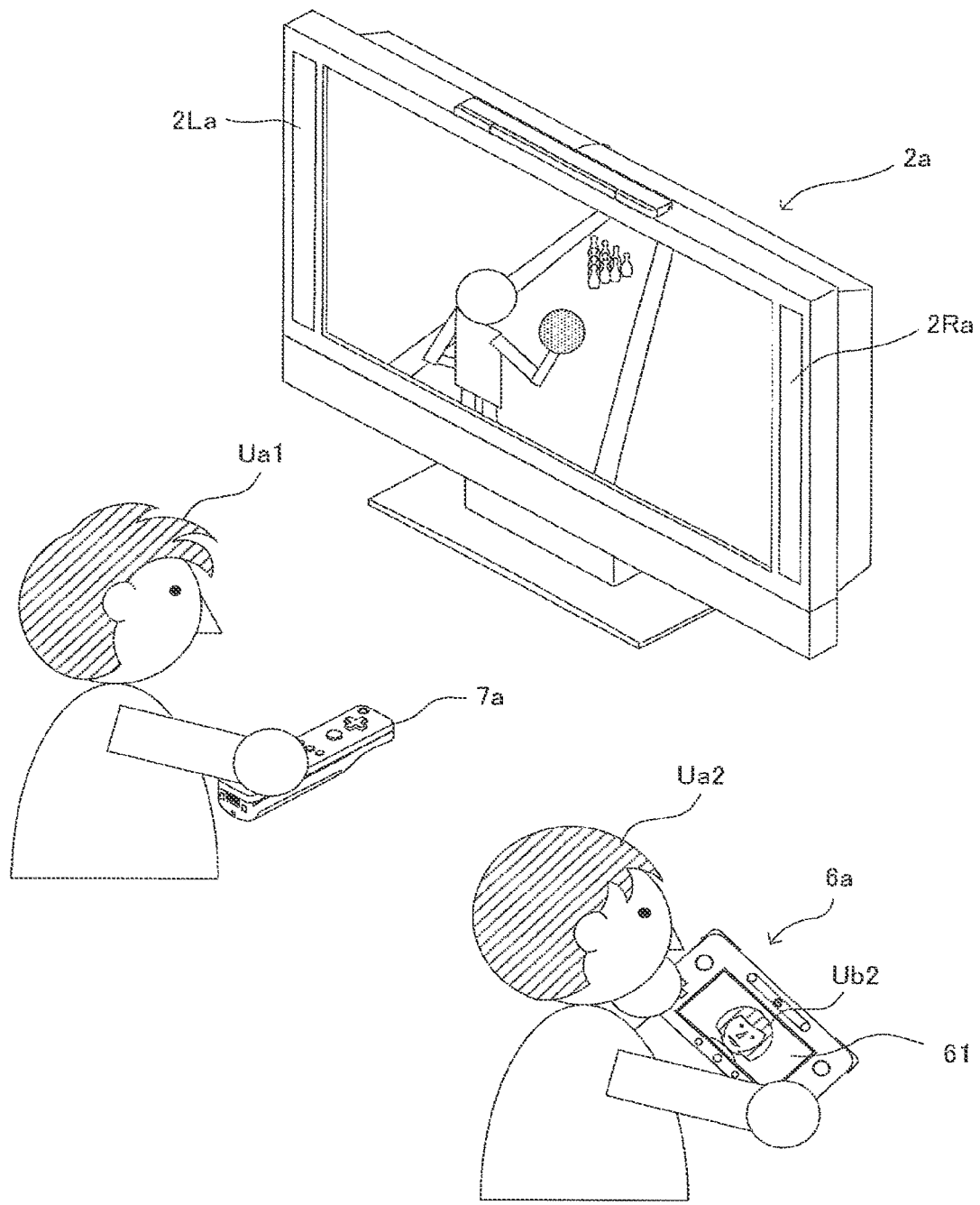
FIG. 10 shows non-limiting examples of images that are displayed on the monitor 2 and the LCD 61 when a network game is being played and video chat is being conducted.

Thus, as shown in FIG. 10, when the user Ua1 and the user Ub1 are playing the game, the user Ua2 and the user Ub2 are allowed to enjoy a conversation in real time while viewing each other's face.

When the user Ua2 and the user Ub2 are having video chat, a game image is displayed on the monitor 2a in the same way as usual, and game sounds are outputted from loudspeakers 2Ra and 2La in the same way as usual. Therefore, it does not become difficult for the user Ua1 to view the game image and catch the game sounds.

In FIG. 9, when the user Ua2 touches an end button B2, the video chat is ended, and then the game image (sub game image) as shown in FIG. 8 is displayed again on the LCD 61 of the terminal device 6a.

Figure 11:
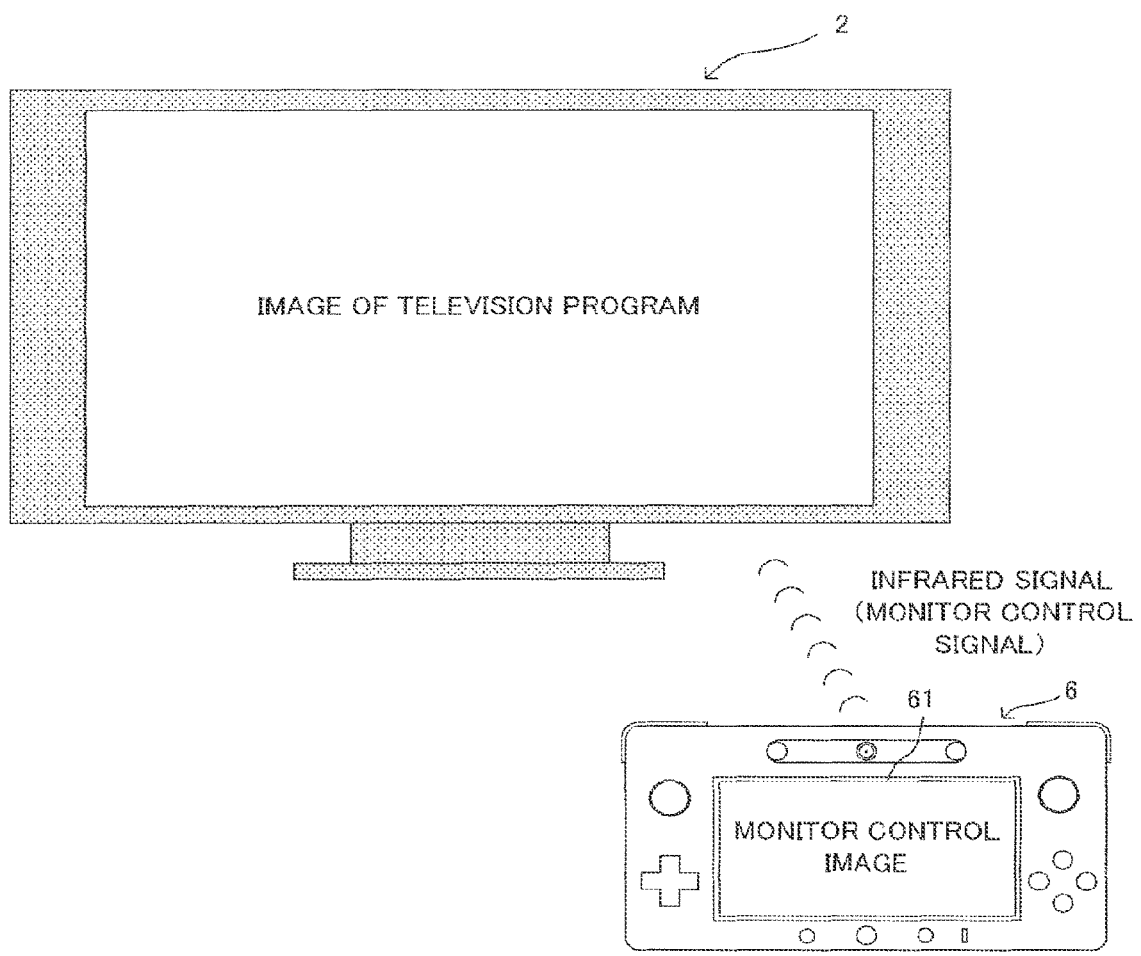
FIG. 11 shows non-limiting examples of images that are displayed on the monitor 2 and the LCD 61 when a television program is being viewed.
Figure 12:
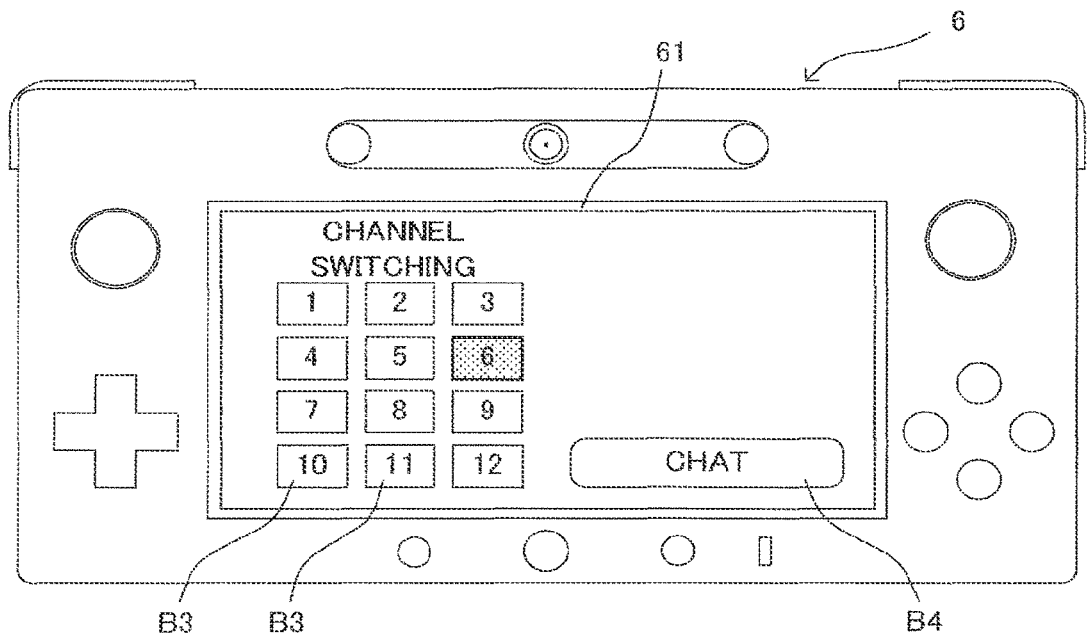
FIG. 12 shows a non-limiting example of a monitor control image displayed on the LCD 61.

The game system 1 can be used for applications other than games. For example, as shown in FIG. 11, a user can view television programs by means of the monitor 2. In this case, a monitor control image as shown in FIG. 12 is displayed on the LCD 61 of the terminal device 6. When the user touches a desired one of a plurality of channel selection buttons B3 displayed in the monitor control image, an infrared signal (monitor control signal) corresponding to the touched channel selection button B3 is outputted from the infrared communication module 612 of the terminal device 6 (see FIG. 11). Thus, the user can switch broadcast channels (television programs) to be displayed on the monitor 2 by operating the terminal device 6.

In the monitor control image, a channel selection button B3 corresponding to a broadcast channel that the user is viewing may be highlighted. In the example of FIG. 12, the channel selection button B3 corresponding to the 6th channel is highlighted. The channel selection button B3 corresponding to the 6th channel remains highlighted until the user touches another channel selection button B3.

As shown in FIG. 12, a chat start button B4 is also displayed in the monitor control image. If the user touches the chat start button B4, he/she can enjoy chat with another user who is viewing the same broadcast channel (television program).

In FIG. 12, when the user touches the chat start button B4, user identification information indicating the user, and currently-viewed channel information indicating a broadcast channel that the user is currently viewing (6th channel in the example of FIG. 12), are uploaded from the game apparatus body 5 into the server device 9 (see FIG. 6). Further, user identification information (user names, for example) indicating other users who are viewing the same television program, connection information (global IP addresses of the other users, for example), and the like, are downloaded from the server device 9 into the game apparatus body 5. In this manner, preparations for chat between the users are completed. Alternatively, a friend list D3 or the like, which will be described later, may be uploaded from the game apparatus body 5 into the server device 9, whereby user identification information, connection information, and the like about pre-registered users (friends, for example) among the other users who are viewing the same television program may be downloaded from the server device 9 into the game apparatus body 5.

Figure 13:
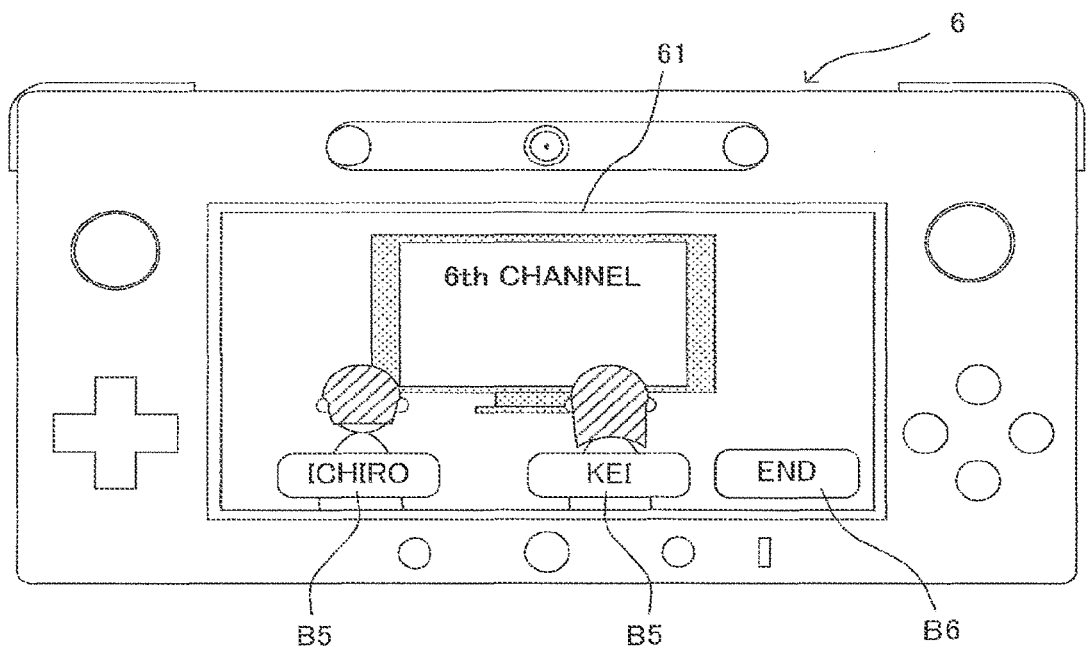
FIG. 13 shows a non-limiting example of a chat image displayed on the LCD 61.

When preparations for chat between the users have been completed, a chat image as shown in FIG. 13 is displayed on the LCD 61 of the terminal device 6. Characters and user names corresponding to the other users viewing the same television program are displayed in the chat image. Referring to the example of FIG. 13, it is understood that two users, "Ichiro" and "Kei", are viewing the television program of the 6th channel.

Figure 14:
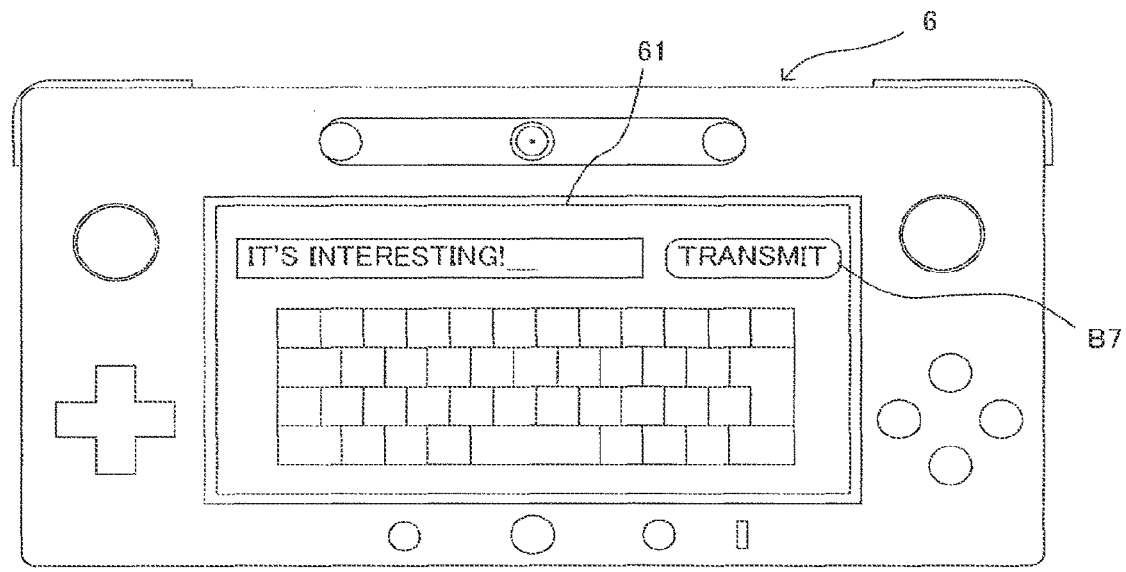
FIG. 14 shows a non-limiting example of a chat image displayed on the LCD 61.

In FIG. 13, when the user touches a user selection button B5 associated with another user to whom the user wants to send a message, a massage input image as shown in FIG. 14 is displayed. Thereafter, when the user inputs a message by using, for example, a software key board and touches a transmission button B7, the message is transmitted to the other user selected by means of the user selection button B5.

Figure 15:
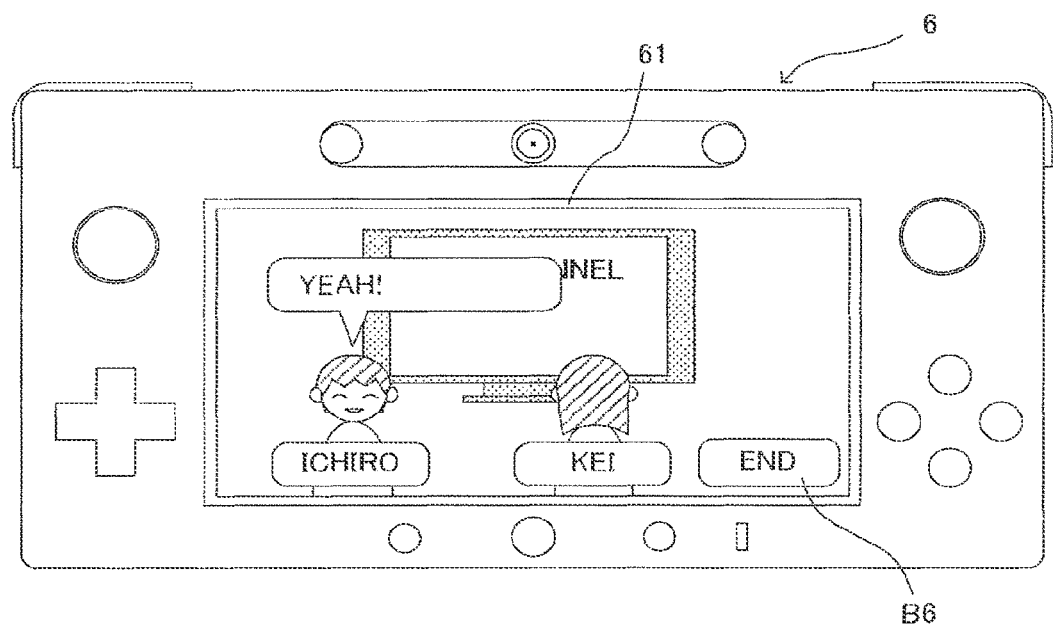
FIG. 15 shows a non-limiting example of a chat image displayed on the LCD 61.

When a message arrives from the other user, the received message is displayed in the chat image, as shown in FIG. 15.

In FIG. 13 or FIG. 15, when the user touches an end button B6, the chat is ended, and the monitor control image as shown in FIG. 12 is displayed again on the LCD 61 of the terminal device 6.

Hereinafter, operations of the game system 1 for realizing the information processing will be described in detail with reference to FIG. 16 to FIG. 19.

Figure 16:
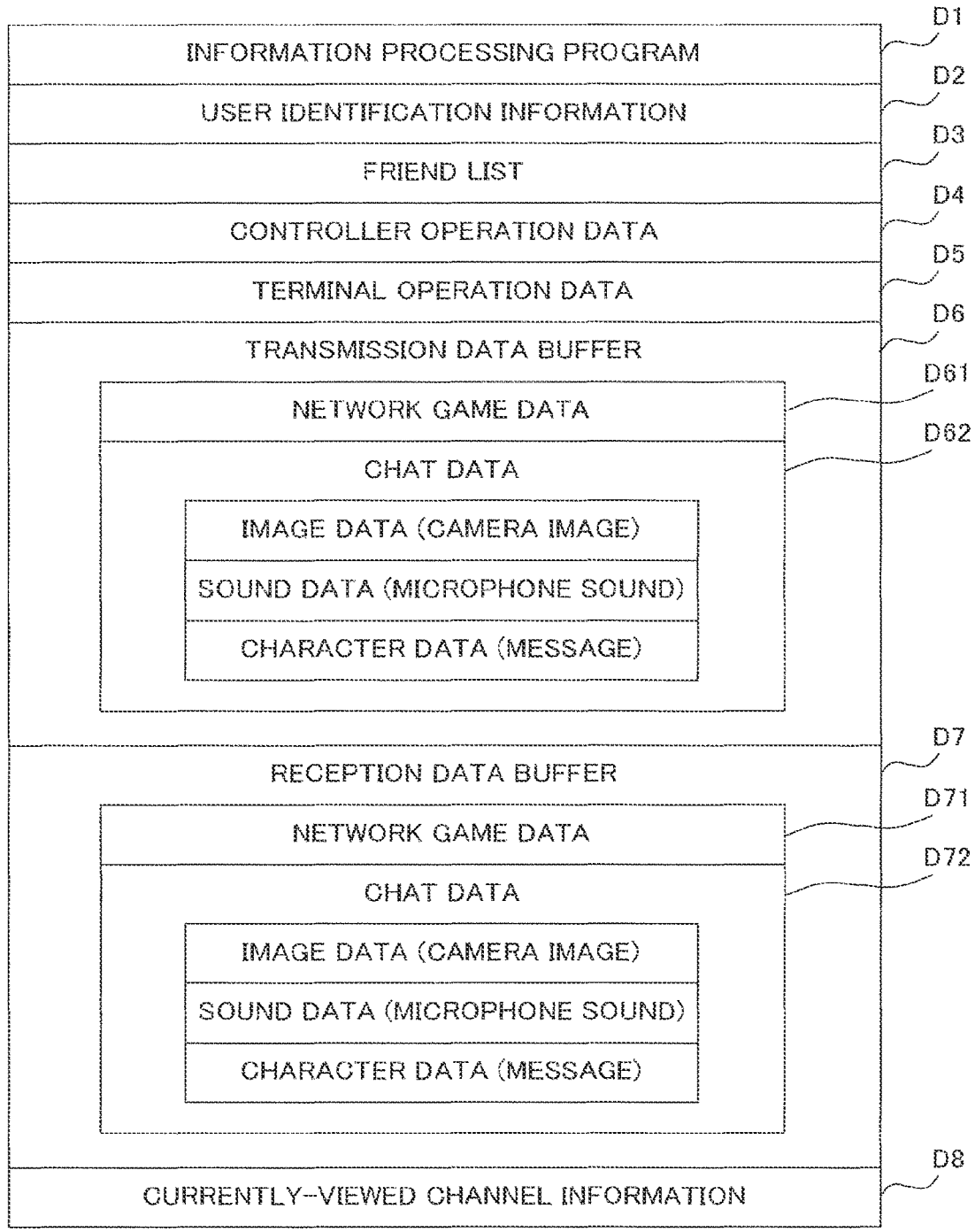
FIG. 16 shows a non-limiting example of a memory map of an external main memory 12.

FIG. 16 illustrates an example of various data stored in the external main memory 12 of the game apparatus body 5 when the information processing is executed.

An information processing program D1 is a program for causing the CPU 10 of the game apparatus body 5 to execute the information processing. For example, the information processing program D1 is loaded into the external main memory 12 from the optical disc 4.

User identification information D2 is information (user name, for example) for identifying a user of the game apparatus body 5.

The friend list D3 is information for identifying the user's friends. The user can select a desired friend among his/her friends registered in the friend list D3, and can play a network game together with the selected friend.

Controller operation data D4 is operation data which is periodically transmitted from the controller 7.

Terminal operation data D5 is operation data which is periodically transmitted from the terminal device 6. As described above, the terminal operation data D5 includes the touch position data and the like.

Transmission data buffer D6 is a storage area for temporarily storing network game data D61 and chat data D62 which are to be transmitted to another game apparatus body 5. Network game data is data transmitted and received to and from another game apparatus body 5 in order for the network game to be executed. The network game data may be the controller operation data, for example. The chat data includes image data, sound data, and character data which are inputted via the camera 66, the microphone 609, and the touch panel 62, respectively, of the terminal device 6.

Reception data buffer D7 is a storage area for temporarily storing network game data D71 and chat data D72 which are received from another game apparatus body 5.

The currently-viewed channel information is information indicating a broadcast channel that the user is currently viewing.

Next, the flow of the information processing, which is executed by the CPU 10 of the game apparatus body 5 based on the information processing program D1, will be described with reference to flowcharts shown in FIG. 17 to FIG. 19.

Figure 17:
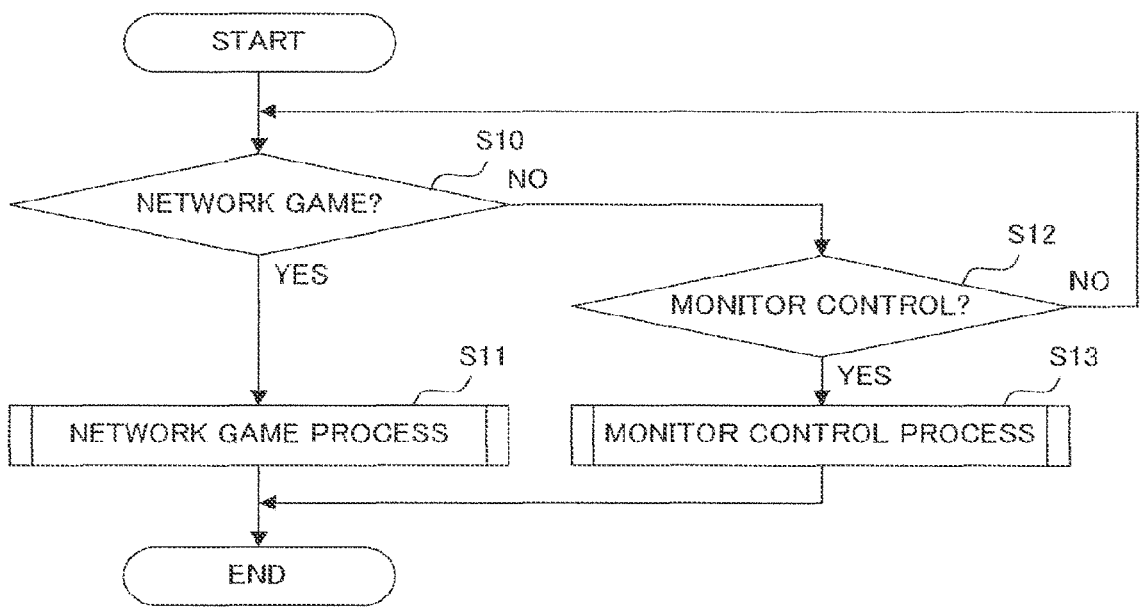
FIG. 17 shows a non-limiting example of a flowchart illustrating the flow of information processing based on information processing program D1.

When the execution of the information processing program D1 is started, the CPU 10 determines, at step S10 in FIG. 17, whether or not to execute the network game. For example, the CPU 10 makes the determination by displaying a menu image on the monitor 2 or on the LCD 61 of the terminal device 6, and then causing the user to select whether the network game is executed or monitor control is performed. If the network game is executed, the processing proceeds to step S11. Otherwise, the processing proceeds to step S12.

At step S11, the CPU 10 executes a network game process. The network game process will be described in detail later. When the network game process ends, the CPU 10 ends the execution of the information processing program D1.

At step S12, the CPU 10 determines whether or not to perform monitor control. If the monitor control is performed, the processing proceeds to step S13. Otherwise, the processing returns to step S10.

At step S13, the CPU 10 executes a monitor control process. The monitor control process will be described later. When the monitor control process ends, the CPU 10 ends the execution of the information processing program D1.

Next, the network game process at step S11 in FIG. 17 will be described in detail with reference to FIG. 18.

At step S20, the CPU 10 selects another user who is to be a communication partner playing the network game. Various methods for selecting a communication partner are conceivable. For example, the user may be allowed to select one or more desired friends among his/her friends registered in the friend list D3. Alternatively, a method may be used in which the game apparatus body 5 makes an inquiry to the server device 9, and the server device 9 introduces other users who can play the network game.

At step S21, the CPU 10 connects to the game apparatus body 5 of the communication partner selected at step S20. For example, in the case where the communication partner is selected among the user's friends registered in the friend list D3, the CPU 10 may transmit identification information of the selected friend to the server device 9, obtain a global IP address of the game apparatus body 5 of the friend, and transmit a connection request to the game apparatus body 5 of the friend.

At step S22, the CPU 10 obtains the controller operation data D4 and the terminal operation data D5 from the controller 7 and the terminal device 6, respectively.

At step S23, the CPU 10 determines whether or not video chat is being conducted. If video chat is being conducted, (in a period of time from when the user touches the video chat start button B1 in FIG. 8 to when the user touches the end button B2 in FIG. 9, for example), the processing proceeds to step S26. Otherwise, the processing proceeds to step S24.

At step S24, the CPU 10 transmits the network game data D61 to the game apparatus body 5 of the communication partner.

At step S25, the CPU 10 receives the network game data 71 from the game apparatus body 5 of the communication partner.

At step S26, the CPU 10 transmits the network game data D61 and the chat data D62 to the game apparatus body 5 of the communication partner. At this time, since video chat is being conducted, the chat data D62 to be transmitted includes image data and sound data which are inputted from the camera 66 and the microphone 609, respectively, of the terminal device 6.

At step S27, the CPU 10 receives the network game data 71 and the chat data D72 from the game apparatus body 5 of the communication partner.

At step S28, the CPU 10 executes a game process (control of characters in the game world, for example), based on the controller operation data D4 and the received network game data D71.

At step S29, the CPU 10 generates a monitor game image, and outputs the monitor game image to the monitor 2. The outputted monitor game image is displayed on the monitor 2. The GPU 32 may execute part or the whole of the process of generating the monitor game image in accordance with an instruction from the CPU 10.

At step S30, the CPU 10 determines whether or not video chat is being conducted. If video chat is being conducted, the processing proceeds to step S33. Otherwise, the processing proceeds to step S31.

At step S31, the CPU 10 generates a terminal game image (the sub game image in FIG. 8, for example), and outputs the terminal game image to the terminal device 6. The outputted terminal game image is displayed on the LCD 61 of the terminal device 6. The GPU 32 may execute part or the whole of the process of generating the terminal game image in accordance with an instruction from the CPU 10.

At step S32, the CPU 10 outputs game sounds to the loudspeakers 2R and 2L.

At step S33, the CPU 10 outputs, to the terminal device 6, the received chat data (image data and sound data). Thus, the face of the communication partner is displayed on the LCD 61 of the terminal device 6, and the voice of the communication partner is outputted from the loudspeakers 607 of the terminal device 6.

At step S34, the CPU 10 determines whether or not the game has been ended. If the game has been ended, the network game process is ended. Otherwise, the processing returns to step S22.

Next, the monitor control process at step S13 in FIG. 17 will be described in detail with reference to FIG. 19.

At step S40, the CPU 10 generates a monitor control image (the monitor control image in FIG. 12, for example), and outputs the monitor control image to the terminal device 6. The outputted monitor control image is displayed on the LCD 61 of the terminal device 6.

At step S41, the CPU 10 obtains the terminal operation data D5 from the terminal device 6.

At step S42, the CPU 10 determines, based on the terminal operation data D5, whether or not a channel selection instruction has been inputted (whether or not any one of the channel selection buttons B3 in FIG. 12 has been touched, for example). If a channel selection instruction has been inputted, the processing proceeds to step S43. Otherwise, the processing proceeds to step S45.

At step S43, the CPU 10 causes the terminal device 6 to output a monitor control signal, in accordance with a broadcast channel selected through the channel selection instruction. Specifically, the CPU 10 detects the position, on the monitor control image, that has been touched by the user, based on the touch position data included in the terminal operation data D5. Then, the CPU 10 transmits control data to the terminal device 6 such that a monitor control signal corresponding to the position touched by the user is outputted from the infrared communication module 612 of the terminal device 6.

At step S44, the CPU 10 updates the currently-viewed channel information D8, in accordance with the broadcast channel selected through the channel selection instruction.

At step S45, the CPU 10 determines whether or not a chat start instruction has been inputted (whether or not the chat start button B4 in FIG. 12 has been touched, for example).

If the chat start instruction has been inputted, the processing proceeds to step S46. Otherwise, the processing proceeds to step S51.

At step S46, the CPU 10 uploads the currently-viewed channel information D8, the user identification information D2, and the like, into the server device 9.

The server device 9 retains currently-viewed channel information D8 and user identification information D2 uploaded from a plurality of game apparatus bodies 5. Accordingly, when currently-viewed channel information 8 and user identification information D2 are uploaded into the server device 9 from still another game apparatus body 5, the server device 9 can provide, to the still other game apparatus body 5, user identification information D2 of users who are viewing the same television program that the user of the still other game apparatus body 5 is viewing.

At step S47, the CPU 10 downloads, from the server device 9, user identification information D2 of other users who are viewing the same television program that the user of the game apparatus body 5 including the CPU 10 is viewing.

At step S48, the CPU 10 executes a chat process, based on the terminal operation data D5. Specifically, the CPU 10 executes, for example, the following processes: a process of transmitting, to the game apparatus body 5 of another user specified by the user, the chat data D62 representing a message (character data) inputted by the user (see FIG. 14); and a process of generating a chat image that includes a message (character data) included in the chat data D72 received from another game apparatus body 5, and displaying the chat image on the LCD 61 (see FIG. 15).

At step S49, the CPU 10 determines whether or not a chat end instruction has been inputted (whether or not the end button B6 in FIG. 13 or FIG. 15 has been touched, for example). If a chat end instruction has been inputted, the processing proceeds to step S50. Otherwise, the processing returns to step S47.

At step S50, the CPU 10 transmits a chat end notification to the server device 9. Then, the currently-viewed channel information D8 and the user identification information D2 of the user of the game apparatus body 5 is deleted from the server device 9.

At step S51, the CPU 10 determines whether the monitor control has been ended. If the monitor control has been ended, the monitor control process ends. Otherwise, the processing returns to step S40.

As described above, according to the exemplary embodiment, when a user (main user) is playing a game by means of the monitor 2 or when he/she is viewing a television program by means of the monitor 2, another user (sub user) is allowed to have video chat or text chat by using the LCD 61 of the terminal device 6. Therefore, it is possible to have chat without affecting playing of a game or viewing of a television program.

Further, according to the exemplary embodiment, a game process and a chat process can be executed independently in parallel by means of a single game apparatus 3. Therefore, when a user (user A) is playing a game, another user (user B) can have chat by using the terminal device 6 of the game apparatus 3. By having chat using the terminal device 6, a user can feel as if he/she is joining a game without actually joining the game, and thus even a person who is poor at games can lightheartedly get enjoyment. In addition, since the terminal device 6 includes the touch panel 62, even a person who is unfamiliar with games can easily perform a menu operation and a character input operation. Further, if a user who is not interested in games has chat when another user is playing a game, this may lead the user to find games to be fun and have interest in games.

Further, according to the exemplary embodiment, when a main user is playing a network game, a sub user can start video chat by just touching the video chat start button B1 (FIG. 8). This saves the sub user the trouble of selecting a chat partner or inputting address information of a chat partner in order to start video chat. Further, by joining chat, even a user who is poor at playing games can spend enjoyable time together with another user who is playing a network game.

Further, according to the exemplary embodiment, game sounds are outputted from the loudspeakers 2R and 2L, and the voice of a chat partner is outputted from the loudspeakers 607 of the terminal device 6. Therefore, game sounds do not become difficult for a main user to catch, and the voice of a chat partner does not become difficult for a sub user to distinguish.

Further, according to the exemplary embodiment, broadcast channels (television programs) to be displayed on the monitor 2 can be switched by means of the terminal device 6. In addition, a user can easily start, in accordance with his/her desire, chat with another user who is viewing the same television program, and can enjoy chatting about their common topic, i.e., the television program they are viewing.

The above-described embodiment is only an example.

In the above-described embodiment, a network game is played, or chat is conducted, between two game apparatuses 3. Alternatively, in another embodiment, a network game may be played, or chat may be conducted, among three or more game apparatuses 3. In the case where video chat is conducted among three or more game apparatuses 3, the screen of the LCD 61 may be divided, and a plurality of users who are communication partners may be displayed at the same time.

Further, in the above-described embodiment, when a network game is being played by means of the monitor 2, video chat is conducted by means of the terminal device 6. Alternatively, text chat may be conducted instead of video chat.

Further, in the above-described embodiment, when a television program is being viewed by means of the monitor 2, text chat is conducted by means of the terminal device 6. Alternatively, video chat may be conducted instead of text chat.

Further, in the above-described embodiment, when a user is viewing a television program by means of the monitor 2, user identification information and the like of other users who are viewing the same television program are obtained from the server device 9 to allow the user to chat with another user. Alternatively, in another embodiment, a user may be allowed to select a desired friend among his/her friends registered in the friend list D3, and to chat with the selected friend.

Further, in the above-described embodiment, game sounds are outputted from the loudspeakers 2R and 2L, and the voice of a chat partner is outputted from the loudspeakers 607 of the terminal device 6. Alternatively, in another embodiment, game sounds may be outputted from the loudspeakers 607 of the terminal device 6. Similarly, the voice of a chat partner may be outputted from the loudspeakers 2R and 2.

Figure 18:
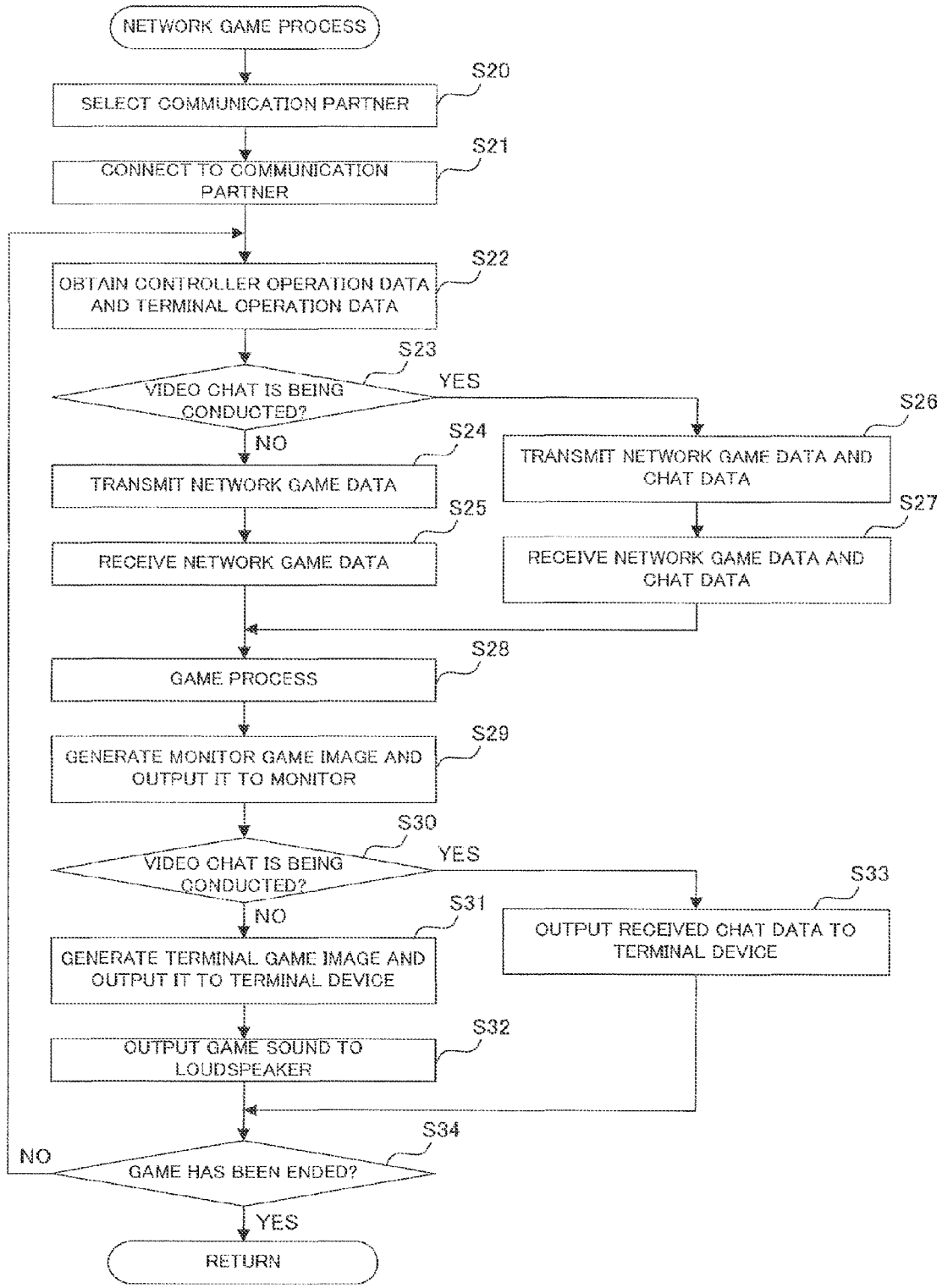
FIG. 18 shows a non-limiting example of a flowchart illustrating the flow of a network game process.
Figure 19:
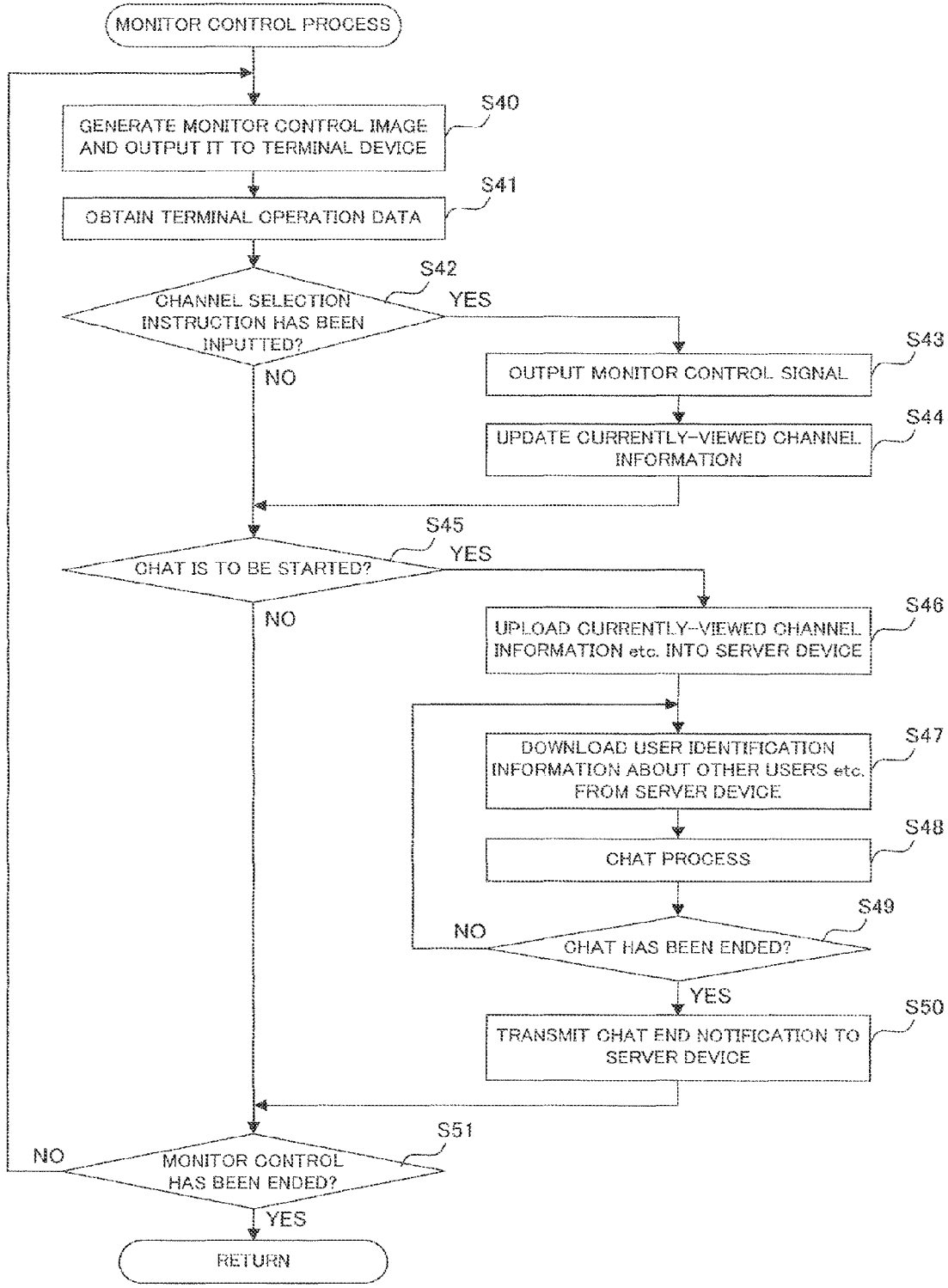
FIG. 19 shows a non-limiting example of a flowchart illustrating the flow of a monitor control process.

Further, in the above-described embodiment, a single computer (CPU 10) executes the plurality of processes shown in FIG. 17 to FIG. 19. Alternatively, in another embodiment, a plurality of computers may share the execution of the plurality of processes. In still another embodiment, part of the plurality of processing may be realized by a hardware circuit.

Further, in the above-described embodiment, the game apparatus 3 executes the image processing. Alternatively, in another embodiment, an information processing apparatus (general-purpose computer, for example) other than the game apparatus may execute the image processing.

Further, in the above-described embodiment, a single information processing apparatus (game apparatus body 5) executes the plurality of processes shown in FIG. 17 to FIG. 19. Alternatively, in another embodiment, a plurality of information processing apparatuses (game apparatus body 5 and terminal device 6, for example) may share the execution of the plurality of processes.

Further, in the above-described embodiment, the information processing program D1 is supplied to the game apparatus body 5 from the optical disc 4. Alternatively, in another embodiment, the information processing program D1 may be supplied to the game apparatus body 5 from any computer-readable storage medium (such as a CD-ROM, a semiconductor memory, or the like). In still another embodiment, the information processing program D1 may be previously stored in a non-volatile memory (ROM/RTC 13, flash memory 17) inside the game apparatus body 5 In still another embodiment, the information processing program D1 may be transmitted to the game apparatus body 5 from another information processing apparatus (game apparatus or server device).

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

While the exemplary embodiments have been described in detail, the foregoing description is only illustrative in all aspects, and is not intended to limit the scope of the appended claims. It is understood that numerous other modifications and variations can be devised.

What is claimed is:

1. A non-transitory computer-readable storage medium having stored therein an information processing program executable by a computer processor of an information processing apparatus comprising an input section having an imaging section for capturing an image, a display section for displaying an image, and a communicator configured to communicate with another information processing apparatus which functions as a communication counterpart apparatus, the information processing program causing the computer processor to perform operations and function as:

a first processor configured to perform a first process of displaying via the display section a result of a particular information process involving a communication with the communication counterpart apparatus, based at least in part on input data provided via the input section;

a second processor configured to transmit, to the communication counterpart apparatus, captured image data provided via the imaging section, and to perform a second process of causing an image to be displayed via the display section, said image based on image data received from the communication counterpart apparatus; and a process switcher configured to switch between performing the first process and performing the second process while maintaining an ongoing communication with the communication counterpart apparatus.

2. The computer-readable storage medium according to claim 1, wherein the information process is a game process.

3. The computer-readable storage medium according to claim 1, wherein the process switcher switches the first process and the second process based on an input from the input section.

4. The computer-readable storage medium according to claim 3, wherein the input section includes a touch panel, and
the process switcher switches the first process and the second process based on an input from the touch panel.

5. The computer-readable storage medium according to claim 1, wherein the information processing apparatus further includes a sound output section and a sound input section,
and wherein the second processor transmits, to the communication counterpart apparatus, captured image data together with sound provided via the sound input section, and outputs, via the sound output section, sound received from the communication counterpart apparatus.

6. The computer-readable storage medium according to claim 1, wherein the input section includes a touch panel, and
the first processor performs the information process based on at least an input from the touch panel.

7. The computer-readable storage medium according to claim 1, wherein the information processing apparatus further includes a storage section configured to store user identification information about users of other information processing apparatuses, and
wherein the information processing program further causes the computer processor to perform operations and function as a communication counterpart determiner configured to determine an identity of a communication counterpart apparatus, based upon the user identification information stored in the storage section concerning users of other information processing apparatuses.

8. The computer-readable storage medium according to claim 7, wherein the communication counterpart determiner selects user identification information from among user identification information stored in the storage section concerning users of other information processing apparatuses based upon an input from the input section and determines an information apparatus associated with the user identification information which is selected as being the communication counterpart apparatus.

9. The computer-readable storage medium according to claim 1, wherein the process switcher switches display of the first process and display of the second process without changing the communication counterpart apparatus.

10. A portable information processing apparatus having a display and one or more input mechanisms including a camera, the information processing apparatus comprising:
a communications section configured to communicate with another information processing apparatus which functions as a communication counterpart; and
a computer processor configured to:
perform a particular information process;
perform a first process of displaying an image based on the particular information process on the display;
provide to the communication counterpart via the communications section, and without affecting the particular information process, an image obtained via the camera;
perform a second process of receiving a camera image from the communication counterpart and displaying the received camera image on the display; and
switch between performing the first process and performing the second process while maintaining an ongoing communication with the communication counterpart.

11. An information processing system including a portable display device having a display and a camera, the processing system comprising:
a communications section configured to communicate with another information processing system or apparatus which functions as a communication counterpart; and
a computer processor configured to:
perform a particular information process;
perform a first process of displaying an image based on the particular information process on the display of the portable display device;
provide to the communication counterpart via the communications section, and without affecting the particular information process, an image obtained via the camera;
perform a second process of receiving a camera image from the communications counterpart and displaying the received camera image on the display of the portable display device; and
switch between performing the first process and performing the second process while maintaining an ongoing communication with the communication counterpart.

12. An information processing method implemented using an information processing system or apparatus having a computer processor and a display and including a camera and communications circuitry configured to enable communications with another information processing system or apparatus which functions as a communication counterpart, the information processing method comprising:
causing the computer processor to execute a particular information process;
performing a first process of displaying an image on the display that is based on the particular information process;
providing to the communication counterpart via the communications circuitry, and without affecting the particular information process being executed, an image obtained via the camera;
performing a second process of receiving a camera image from the communication counterpart and displaying the received camera image on the display; and
switching between the first process and the second process while maintaining an ongoing communication with the communication counterpart.

* * * * *